US010616569B2

(12) United States Patent
Suginohara et al.

(10) Patent No.: US 10,616,569 B2
(45) Date of Patent: Apr. 7, 2020

(54) IMAGE PROCESSING APPARATUS, IMAGE DISPLAY APPARATUS, AND IMAGE PROCESSING METHOD

(71) Applicant: MITSUBISHI ELECTRIC CORPORATION, Tokyo (JP)

(72) Inventors: Hidetsugu Suginohara, Tokyo (JP); Hirotaka Sakamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 539 days.

(21) Appl. No.: 15/534,433

(22) PCT Filed: Dec. 9, 2015

(86) PCT No.: PCT/JP2015/084471
§ 371 (c)(1),
(2) Date: Jun. 8, 2017

(87) PCT Pub. No.: WO2016/121233
PCT Pub. Date: Aug. 4, 2016

(65) Prior Publication Data
US 2018/0352216 A1 Dec. 6, 2018

(30) Foreign Application Priority Data

Jan. 30, 2015 (JP) .................. 2015-016327
Jul. 13, 2015 (JP) .................. 2015-139384

(51) Int. Cl.
*H04N 13/395* (2018.01)
*G09G 3/36* (2006.01)
(Continued)

(52) U.S. Cl.
CPC .......... *H04N 13/395* (2018.05); *G02B 30/24* (2020.01); *G02B 30/52* (2020.01); *G02F 1/1347* (2013.01);
(Continued)

(58) Field of Classification Search
CPC .......... H04N 13/395; G09G 3/36; G09G 3/20; G09G 3/003; G03B 35/24; G02F 1/1347
See application file for complete search history.

(56) References Cited

U.S. PATENT DOCUMENTS 6,525,699 B1   2/2003   Suyama et al.
8,004,515 B1 * 8/2011   Cook .................. G03B 35/00
                                                  345/419
(Continued)

FOREIGN PATENT DOCUMENTS

JP        3022558 B1      3/2000
JP     2000-214413 A      8/2000
(Continued)

OTHER PUBLICATIONS

Lanman et al., "Polarization Fields: Dynamic Light Field Display using Multi-Layer LCDs", Total pages of 9.
(Continued)

*Primary Examiner* — Oschta I Montoya
(74) *Attorney, Agent, or Firm* — Birch, Stewart, Kolasch & Birch, LLP

(57) ABSTRACT

An image processing apparatus includes: an initial solution generator that generates, from input images, as an initial solution, internal data of one or more screen images of a layered image, the layered image including multiple screen images consisting of the one or more screen images and one end image; an image generator that iterates a process of generating internal data of the multiple screen images; and a controller that, when a termination condition is satisfied, outputs, as data of the layered image, the finally generated internal data of the multiple screen images. The image generator generates internal data of the multiple screen images from the initial solution in a first round of the process, and then until the termination condition is satisfied, in each round of the process, generates new internal data of (Continued)

the multiple screen images from the internal data generated in the previous round of the process.

16 Claims, 12 Drawing Sheets

(51) Int. Cl.
*G09G 3/20* (2006.01)
*G09G 3/00* (2006.01)
*G03B 35/24* (2006.01)
*G02B 30/24* (2020.01)
*G02B 30/52* (2020.01)
*G02F 1/1347* (2006.01)

(52) U.S. Cl.
CPC ............ *G03B 35/24* (2013.01); *G09G 3/003* (2013.01); *G09G 3/20* (2013.01); *G09G 3/36* (2013.01)

(56) References Cited

U.S. PATENT DOCUMENTS

| | | | |
|---|---|---|---|
| 9,628,782 B2 * | 4/2017 | Moller | H04N 13/305 |
| 9,674,510 B2 * | 6/2017 | Aiden | H04N 13/32 |
| 10,237,544 B2 * | 3/2019 | Kim | G02B 27/01 |
| 2002/0036648 A1 | 3/2002 | Putilin | |

FOREIGN PATENT DOCUMENTS

| | | |
|---|---|---|
| JP | 2002-159025 A | 5/2002 |
| JP | 3472552 B2 | 12/2003 |
| JP | 2005-65087 A | 3/2005 |
| JP | 2007-288317 A | 11/2007 |
| JP | 2008-513842 A | 5/2008 |
| JP | 4593513 B2 | 12/2010 |
| JP | 2014-150402 A | 8/2014 |

OTHER PUBLICATIONS

Suyama et al., "Apparent 3-D image perceived from luminance-modulated two 2-D images displayed at different depths", Vision Research 44 (2004), pp. 785-793.

Takada et al., "A DFD Display with Laminated Two LCD Plates on Front and Back Plane", NTT Gijutsu Journal, Feb. 2005, vol. 17, No. 2, pp. 21-24.

Takada et al., "Protruding Apparent 3D Images in Depth-Fused 3D Display", IEEE Transactions on Consumer Electronics, vol. 54, No. 2, May 2008, pp. 233-239.

Wetzstein et al., "Layered 3D: Tomographic Image Synthesis for Attenuation-based Light Field and High Dynamic Range Displays", ACM Transactions on Graphics, vol. 30, No. 4, Article 95, Publication date: Jul. 2011, Total pages of 11.

* cited by examiner

IMAGE PROCESSING APPARATUS, IMAGE DISPLAY APPARATUS, AND IMAGE PROCESSING METHOD

TECHNICAL FIELD

The present invention relates to an image processing apparatus and an image processing method for providing display of a three-dimensional (3D) image and a multi-view image.

BACKGROUND ART

Image display apparatuses capable of displaying a 3D image include, for example, a liquid crystal shutter system, a polarization system, and other systems. The liquid crystal shutter system displays images for left eye and right eye with binocular parallax, on a flat panel display or the like in a time-division manner. A viewer views a 3D image while wearing liquid crystal shutter glasses that operate in conjunction with the images displayed in a time-division manner. The liquid crystal shutter system is also referred to as a frame sequential system. The polarization system displays an image for left eye using light polarized in a first direction and an image for right eye using light polarized in a second direction different from the first direction, the images having binocular parallax. A viewer views a 3D image while wearing polarization glasses that transmit light for the left eye and light for the right eye that are different in polarization direction from each other. In both the systems, the viewer views images with binocular parallax through the viewer's left and right eyes, and can have stereoscopic perception by virtue of the binocular parallax.

Besides, a parallax barrier system, a lenticular lens system, and other similar systems are 3D image display apparatuses that allow viewers to view 3D images with the naked eye without wearing special glasses. The parallax barrier system is provided with a parallax barrier in front of a flat panel display or the like to separate the pixels of the display into pixels viewable by a left eye and pixels viewable by a right eye, and thereby can present binocular parallax images to the left and right eyes. Likewise, the lenticular lens system is provided with a lenticular lens in front of a flat panel display or the like, and thereby can present binocular parallax images to left and right eyes. The parallax barrier and lenticular lens are referred to as parallax optical elements.

As a 3D image display apparatus that allows a 3D image to be viewed with the naked eye, a 3D image display apparatus using a stack of screens has been devised. Non Patent Literature 1 discloses a method of using a stack of two screens to allow a 3D image to be perceived in front of the front one of the two screens or behind the rear one of the two screens, beyond a space between the two screens. "Front" refers to the viewer side of the screens. "Rear" refers to the opposite side of the viewer with respect to the screens.

CITATION LIST

Non Patent Literature

Non Patent Literature 1: "Layered 3D: Tomographic Image Synthesis for Attenuation-based Light Field and High Dynamic Range Displays", Gordon Wetzstein et al., ACM SIGGRAPH 2011. Transactions on Graphics 30(4).

SUMMARY OF INVENTION

Technical Problem

The use of the conventional method allows depth to be represented beyond the space between the screens. However, there is a problem in that, in determining images to be displayed on the respective stacked screens, the amount of calculation in optimization calculation is so large that a computer with high computing power and a long processing time are required. Also, there is a problem in that expensive special hardware, such as a graphic processor unit (GPU), is required.

Solution to Problem

To solve the above problems, an image processing apparatus of the present invention includes: an input unit that receives a plurality of different input images; an initial solution generator that generates, from data of the plurality of different input images, as an initial solution, internal data of one or more screen images of a layered image, the layered image including a plurality of screen images consisting of the one or more screen images and one end image; a layered image generator that generates internal data of the plurality of screen images from the initial solution and a limiting condition, in a first round of an iterative process; and an iterative process controller that evaluates a process termination condition for terminating generation of internal data of the screen images, and when the process termination condition is satisfied, outputs, as the layered image, internal data of the plurality of screen images finally generated by the layered image generator, wherein until the process termination condition is satisfied, the layered image generator generates new internal data of the plurality of screen images from data of the layered image and the limiting condition, in each of one or more rounds of the iterative process after the first round, and wherein as a number of iterations of the generation increases, a difference between the internal data of the screen images and the new internal data of the screen images decreases.

Advantageous Effects of Invention

According to the present invention, in representing depth beyond a space between screens, by employing a simple process with a reduced amount of calculation, it is possible to employ small-scale hardware.

DESCRIPTION OF EMBODIMENTS

Embodiments of the present invention will be described below with reference to the drawings.

First Embodiment

Figure 1:
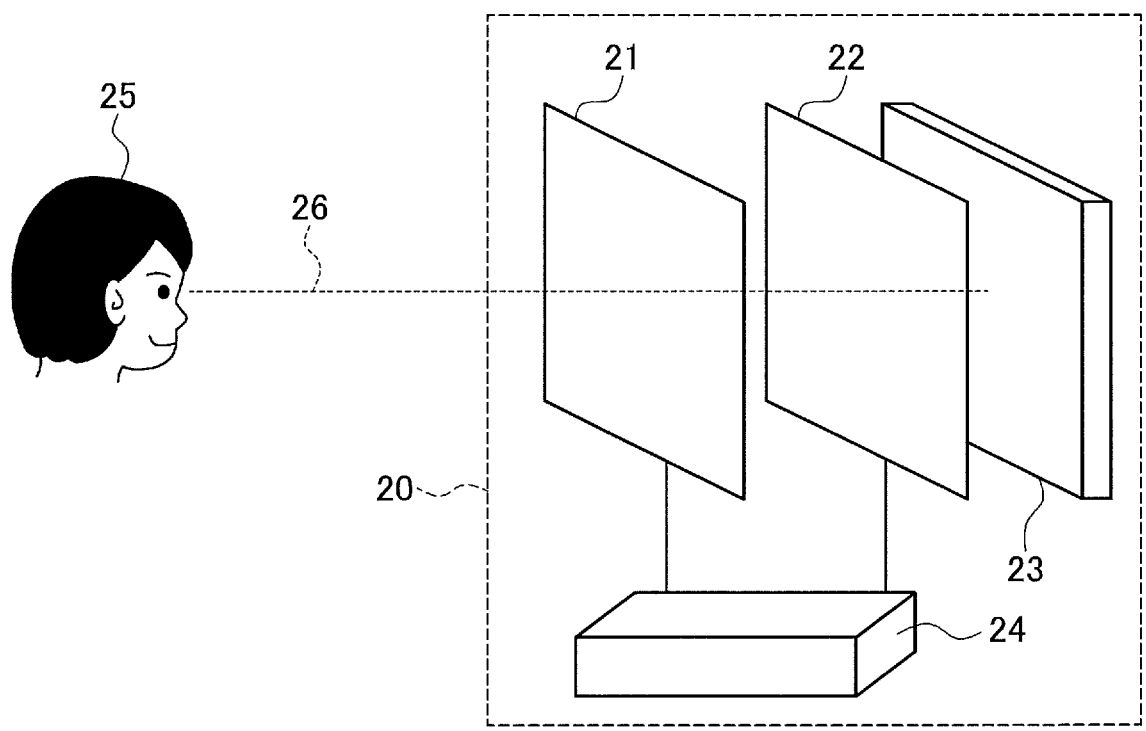
FIG. 1 is an explanatory diagram illustrating a configuration of a 3D image display apparatus 20 of each of first, second, and third embodiments.

FIG. 1 is a view illustrating a configuration of a three-dimensional (3D) image display apparatus 20 of a first embodiment of the present invention. In FIG. 1, the 3D image display apparatus 20 includes liquid crystal layers 21 and 22 that are disposed in this order from a viewer 25 side and that form screens stacked parallel to each other at a predetermined interval, a backlight 23 disposed behind them, and an image processing apparatus 24 that controls images displayed on the liquid crystal layers 21 and 22. Here, the liquid crystal layers 21 and 22 are thin plate-like parts called liquid crystal panels. The viewer 25 views, as an image, a group of light beams from the backlight 23 that pass through the liquid crystal layer 22 and then pass through the liquid crystal layer 21. The line of sight 26 is an example of a line of sight of the viewer. Images displayed on the screens stacked parallel to each other at the predetermined interval will be referred to as a layered image.

Configurations of the liquid crystal layers 21 and 22 will be described. The liquid crystal layers 21 and 22 are transmissive liquid crystal displays, such as TFT liquid crystal displays, having pixel structures. The liquid crystal layers 21 and 22 are each formed by sandwiching a transparent electrode, a liquid crystal, a color filter, or the like between glass substrates and attaching an optical film to a front surface or a rear surface thereof. The optical film includes a polarization film. Light reaching eyes through polarization films can be modeled.

<Modeling of Light Reaching Eyes>

In this embodiment, polarization films are attached on a front surface side of the liquid crystal layer 21 and a rear surface side of the liquid crystal layer 22. The polarization films are different in angle by 90 degrees from each other. When polarized light from the backlight 23 passing through the polarization film on the rear surface side of the liquid crystal layer 22 passes through the liquid crystal layer 22, rotation of the polarization angle occurs depending on a gray level displayed at each pixel of the liquid crystal layer 22. Also, when the polarized light passes through the liquid crystal layer 21, rotation of the polarization angle occurs depending on a gray level displayed at each pixel of the liquid crystal layer 21. This embodiment assumes that the rotation of the polarization angle caused by the liquid crystal layer 22 and the rotation of the polarization angle caused by the liquid crystal layer 21 are linearly added. Finally, polarized light passing through the polarization film on the front surface side of the liquid crystal layer 21 after being subjected to the rotation of the polarization angle by the two liquid crystal layers reaches the eyes of the viewer 25. The intensity of the polarized light passing through the front polarization film varies with a difference between the polarization angle of the front polarization film and the polarization angle of the polarized light passing through the two liquid crystal layers, and thus the viewer 25 can perceive light with different gray levels.

The image processing apparatus 24 generates images to be displayed on the liquid crystal layers 21 and 22, and performs display control. The viewer 25 views the Images displayed on the liquid crystal layers 21 and 22, and thereby can have stereoscopic perception.

Figure 2:
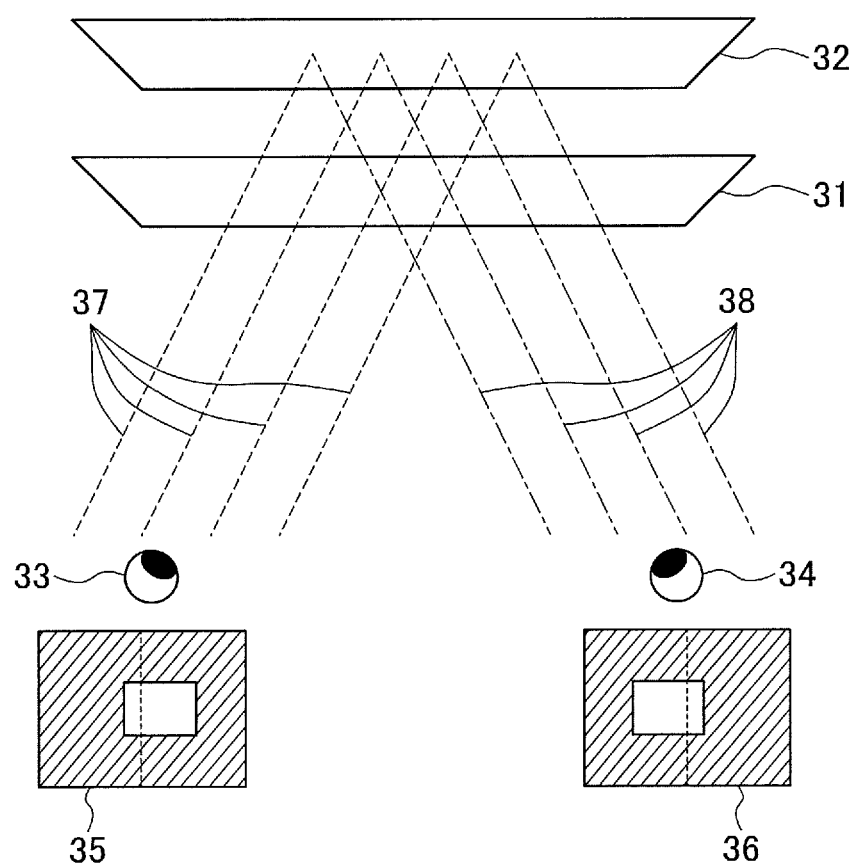
FIG. 2 is an explanatory diagram illustrating a situation where binocular parallax images are displayed using a stack of screens, in the first embodiment.

To provide the viewer 25 with stereoscopic perception, it is necessary to present binocular parallax images to the left and right eyes of the viewer. FIG. 2 illustrates a situation where binocular parallax images are displayed using a stack of screens. In FIG. 2, the stack of screens includes a first screen 31 on a front side close to the viewer and a second screen 32 far from the viewer, which are each viewed by the left eye 33 and right eye 34 of the viewer. The first screen 31 in FIG. 2 corresponds to the liquid crystal layer 21 in FIG. 1. The second screen 32 in FIG. 2 corresponds to the liquid crystal layer 22 in FIG. 1. In this case, if the left eye 33 can view a left-eye image 35 of the binocular parallax images and the right eye 34 can view a right-eye image 36 of the binocular parallax images, the viewer can have stereoscopic perception from the binocular parallax images.

Further, when the parallax included in the binocular parallax images represents an image in front of the liquid crystal layer 21 or behind the liquid crystal layer 22, the viewer 25 can perceive a 3D image in front of or behind the two screens, beyond the screens.

In this embodiment, a direction of the left eye relative to the screens is defined as the angle formed by a straight line and a normal to the screens, the straight line connecting the left eye of the viewer, who is in front of the stack of screens and looks at a center (position at horizontal coordinate x in FIG. 3) of the first screen 31, and a center between the screens; the angle will be referred to as the angle θL. A group of lines of sight 37 parallel to the angle θL are imagined, and a method of displaying the left-eye image 35 to the group of lines of sight of the angle θL will be described. An angle θR is defined similarly, and a method of displaying the right-eye image 36 to a group of lines of sight 38 of the angle θR will be described.

The angle θL is an angle determined by Equation 1 using a distance d between both eyes of the viewer and a distance Q from the viewer to the first screen 31. From the symmetry of both eyes, it is obvious that the angle θR is equal to the angle θL.

$$\theta L = \arctan\left(\frac{d}{2 \cdot Q}\right) \quad \text{(Equation 1)}$$

In Equation 1, the distance d between both eyes of the viewer may be 65 mm, which is an average of distances between both eyes of adults.

Figure 3:
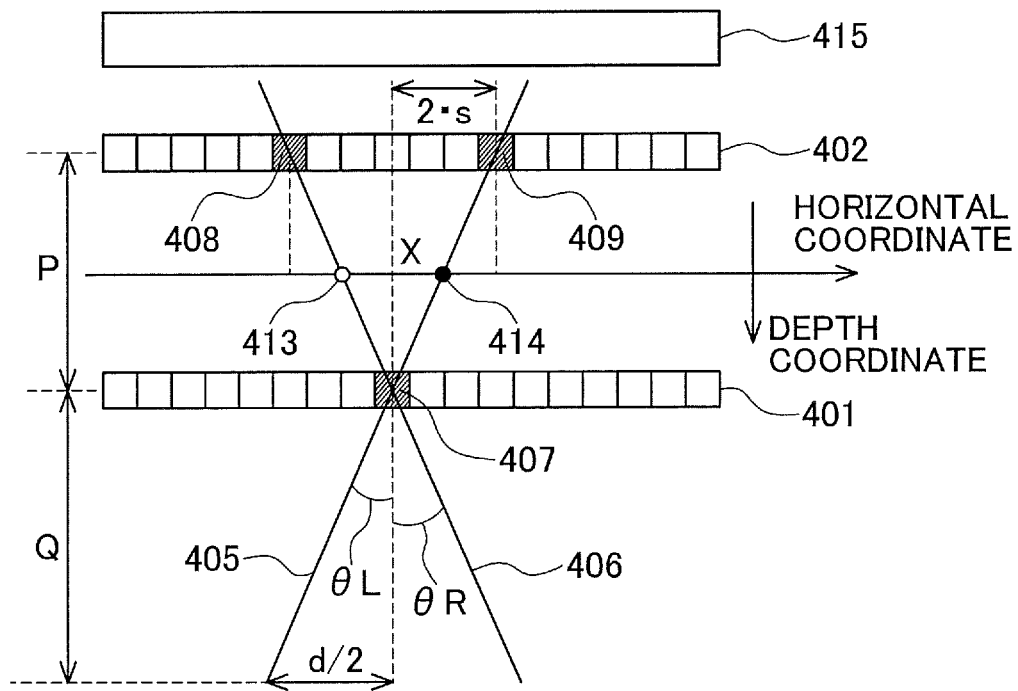
FIG. 3 is an explanatory diagram depicting images viewed from an angle θL and an angle θR in the 3D image display apparatus 20 of the first embodiment, in terms of pixels of the stacked screens.

FIG. 3 is an explanatory diagram illustrating images viewed in a left-eye direction and a right-eye direction in terms of pixels of the stacked screens. FIG. 3 is an overhead view of the 3D image display apparatus 20 as viewed from above. In FIG. 3, the 3D image display apparatus 20 represents images viewed from the angles θL and θR in terms of pixels of the stacked screens. FIG. 3 illustrates a group of pixels 401 of the liquid crystal layer 21, which is the first screen, and a group of pixels 402 of the liquid crystal layer 22, which is the second screen. The groups of pixels 401 and 402 are at the same vertical position. In other words, each of the groups of pixels 401 and 402 is a group of pixels on a line that are aligned in a horizontal direction. The first screen and second screen are stacked at a predetermined interval P. A backlight 415 is disposed on an opposite side of the viewer.

In FIG. 3, an origin is located at a screen center and at a midpoint between the liquid crystal layers 21 and 22; a horizontal coordinate axis parallel to the screens and a depth coordinate axis perpendicularly connecting the screens and the viewer are used. Hereinafter, light viewed through a pixel 407 located at horizontal coordinate x of the group of pixels 401 of the liquid crystal layer 21 will be described with reference to FIG. 3.

Light from the screens to the left eye represented by a line of sight 405 of the left eye depends on rotation of polarized light at the pixel 407 and a pixel 409 on the line of sight 405. When the horizontal coordinate of the pixel 407 is assumed to be x, the horizontal coordinate of the pixel 409 is given by x+2·s using a distance s obtained by Equation 2 using the predetermined distance P and angle θL.

$$s = \frac{P \cdot \tan(\theta L)}{2} \quad \text{(Equation 2)}$$

An image to be displayed on the liquid crystal layer 21 will be denoted by FI, and an image to be displayed on the liquid crystal layer 22 will be denoted by BI. A pixel value at horizontal coordinate n that indicates modulation of light due to rotation of polarized light at the pixel of the liquid crystal layer 21 will be denoted by FI(n). A pixel value at horizontal coordinate m that indicates modulation of light due to rotation of polarized light at the pixel of the liquid crystal layer 22 will be denoted by BI(m).

Here, the pixel values FI(n) and BI(m) are values linear to brightness of light. In typical image display apparatuses including liquid crystal, the brightness of a displayed image has a gamma characteristic with respect to a gray level included in data of an input image. Thus, when a gray level is halved, the brightness is not necessarily halved. A gray level of an image determines the angle of rotation of polarized light, thus determining display brightness. If the pixel values FI(n) and BI(m) indicate display brightness, it is necessary to perform an inverse gamma conversion having a characteristic opposite to the gamma characteristic on them to convert them into gray levels of images.

An image viewed on the line of sight 405 of the left eye will be denoted by L', and a pixel value indicating the brightness of a pixel viewed on the line of sight 405 of the left eye will be denoted by L'(x) using its horizontal coordinate x. The image L' has, as its projection plane, a plane that is parallel to the screens, located at depth coordinate 0, and located at a center between the screens. A pixel of the image L' viewed on the line of sight 405 of the left eye is located at a projection point 414, and its horizontal coordinate is given by x+s.

From the above, on the line of sight 405 of the left eye, the following equation holds.

$$L'(x+s) = FI(x) + BI(x+2 \cdot s) \quad \text{(Equation 3)}$$

Likewise, light on a line of sight 406 of the right eye depends on rotation of polarized light at the pixel 407 and a pixel 408 on the line of sight. When the horizontal coordinate of the pixel 407 is assumed to be x, the horizontal coordinate of the pixel 408 is given by x−2·s using the distance s obtained by Equation 2.

An image viewed on the line of sight 406 of the right eye will be denoted by R', and a pixel value indicating the brightness of a pixel viewed on the line of sight 406 of the right eye will be denoted by R'(x) using its horizontal coordinate x. The image R' has, as its projection plane, a plane that is parallel to the screens, located at depth coordinate 0, and located at a center between the screens. A pixel of the image R' viewed on the line of sight 106 is located at a projection point 413, and its horizontal coordinate is given by x−s.

From the above, on the line of sight 406 of the right eye, the following equation holds.

$$R'(x-s) = FI(x) + BI(x-2 \cdot s) \quad \text{(Equation 4)}$$

Equations 3 and 4 show that it is possible to display different images in left and right directions using the two stacked screens.

Figure 4:
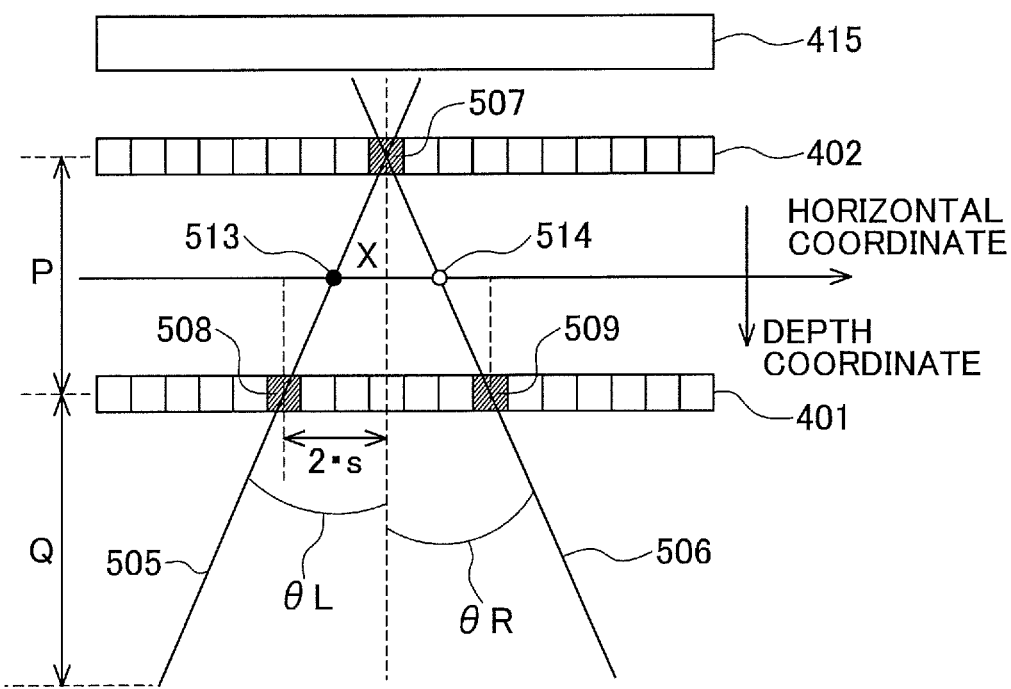
FIG. 4 is an explanatory diagram depicting images viewed from the angle θL and angle θR in the 3D image display apparatus 20 of the first embodiment, in terms of the pixels of the stacked screens.

FIG. 4 is an explanatory diagram illustrating images viewed from the angles θL and θR in terms of pixels of the stacked screens. Similarly to FIG. 3, FIG. 4 is a diagram for explaining light viewed through a pixel 507 located at horizontal coordinate x of the group of pixels 402 of the liquid crystal layer 22. Descriptions of elements in FIG. 4 that are the same as those in FIG. 3 will be omitted.

In FIG. 4, the brightness of light on a line of sight 505 of the left eye depends on rotation of polarized light at the pixel 507 and a pixel 508 on the line of sight. The horizontal coordinate of the pixel 508 can be represented by x−2·s using the distance s given by Equation 2.

When an image viewed on the line of sight 505 of the left eye is denoted by L', a pixel of the image L' viewed on the line of sight 505 is located at a projection point 513, and its horizontal coordinate is given by x−s.

From the above, on the line of sight 505 of the left eye, the following equation holds.

$$L'(x-s) = FI(x-2 \cdot s) + BI(x) \quad \text{(Equation 5)}$$

Likewise, in FIG. 4, the brightness of light on a line of sight 506 of the right eye depends on rotation of polarized light at the pixel 507 and a pixel 509 on the line of sight. The horizontal coordinate of the pixel 509 can be represented by x+2·s using the distance s given by Equation 2.

When an image viewed on the line of sight 506 of the right eye is denoted by R', a pixel of the image R' viewed on the line of sight 506 is located at a projection point 514, and its horizontal coordinate is given by x+s.

From the above, on the line of sight 506 of the right eye, the following equation holds.

$$R'(x+s)=FI(x+2·s)+BI(x) \qquad \text{(Equation 6)}$$

Equations 3 and 4 have been derived using the positional relationship of the screens in the 3D image display apparatus 20 in FIG. 3; Equations 5 and 6 have been derived using the positional relationship of the screens in the 3D image display apparatus 20 in FIG. 4. However, Equation 3 on the line of sight 405 of the left eye is substantially the same as Equation 5 on the line of sight 505 of the left eye. This is obvious from the fact that Equation 5 is obtained by substituting x in Equation 3 with x−2·s. Likewise, Equation 4 on the line of sight 406 of the right eye is substantially the same as Equation 6 on the line of sight 506 of the right eye.

When the image L' viewed on the line of sight 405 of the left eye and the image R' viewed on the line of sight 406 of the right eye are binocular parallax images, or when the image L' viewed on the line of sight 505 of the left eye and the image R' viewed on the line of sight 506 of the right eye are binocular parallax images, the viewer can perceive a 3D image. To realize this, the image processing apparatus 24 generates the image FI to be displayed on the liquid crystal layer 21, i.e., first screen 31, and the image BI to be displayed on the liquid crystal layer 22, i.e., second screen 32, so that input binocular parallax images are converted into the images L' and R'.

Figure 5:
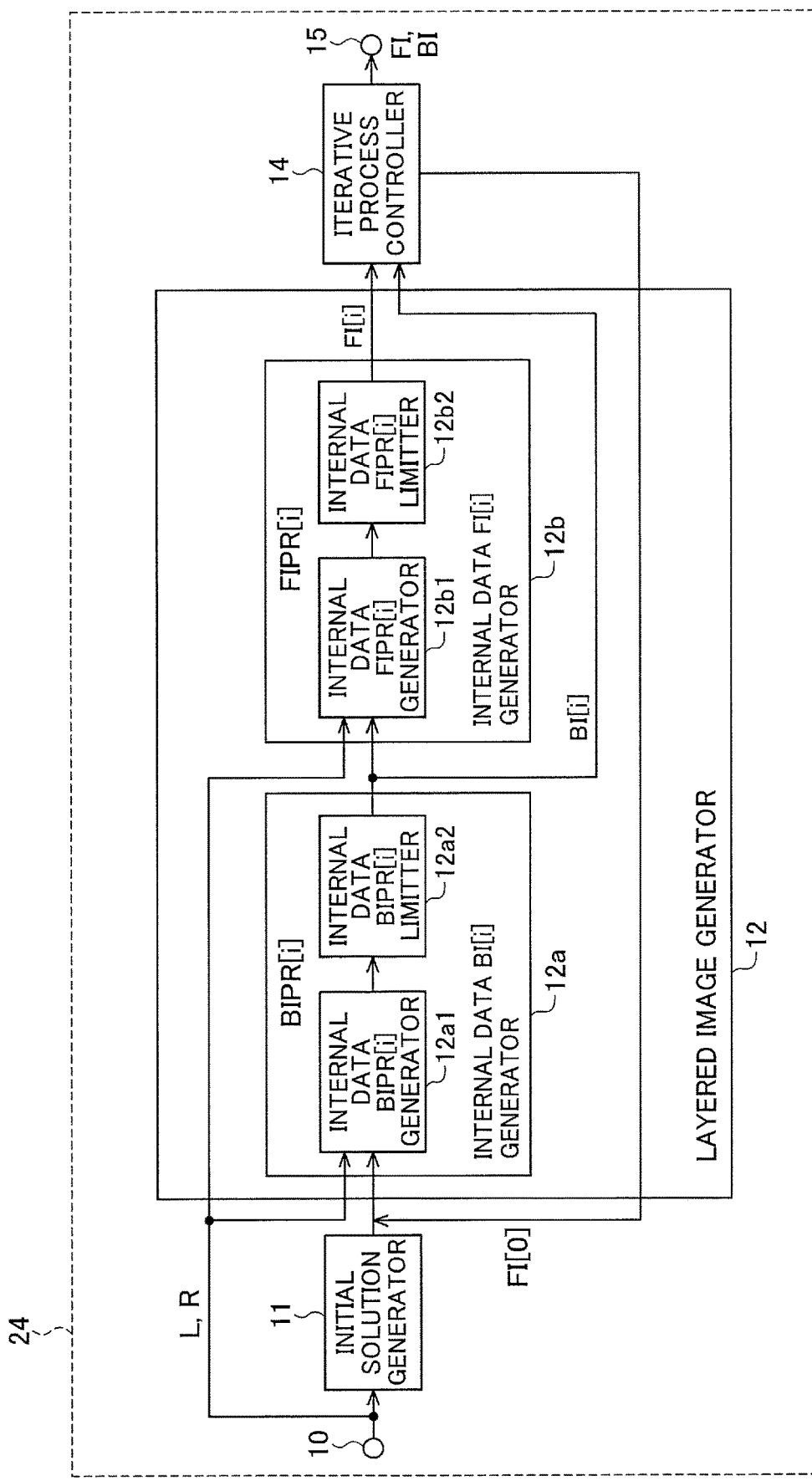
FIG. 5 is a block diagram illustrating a configuration of an image processing apparatus 24 of each of the first and second embodiments.

FIG. 5 is a block diagram illustrating a configuration of the image processing apparatus 24. The image processing apparatus 24 includes an input unit 10, an initial solution generator 11, a layered image generator 12, an iterative process controller 14, and an output unit 15. The layered image generator 12 includes an internal data BI[i] generator 12a and an internal data FI[i] generator 12b. The internal data BI[i] generator 12a includes an internal data BIPR[i] generator 12a1 and an internal data BIPR[i] limiter 12a2. The internal data FI[i] generator 12b includes an internal data FIPR[i] generator 12b1 and an internal data FIPR[i] limiter 12b2.

Figure 6:
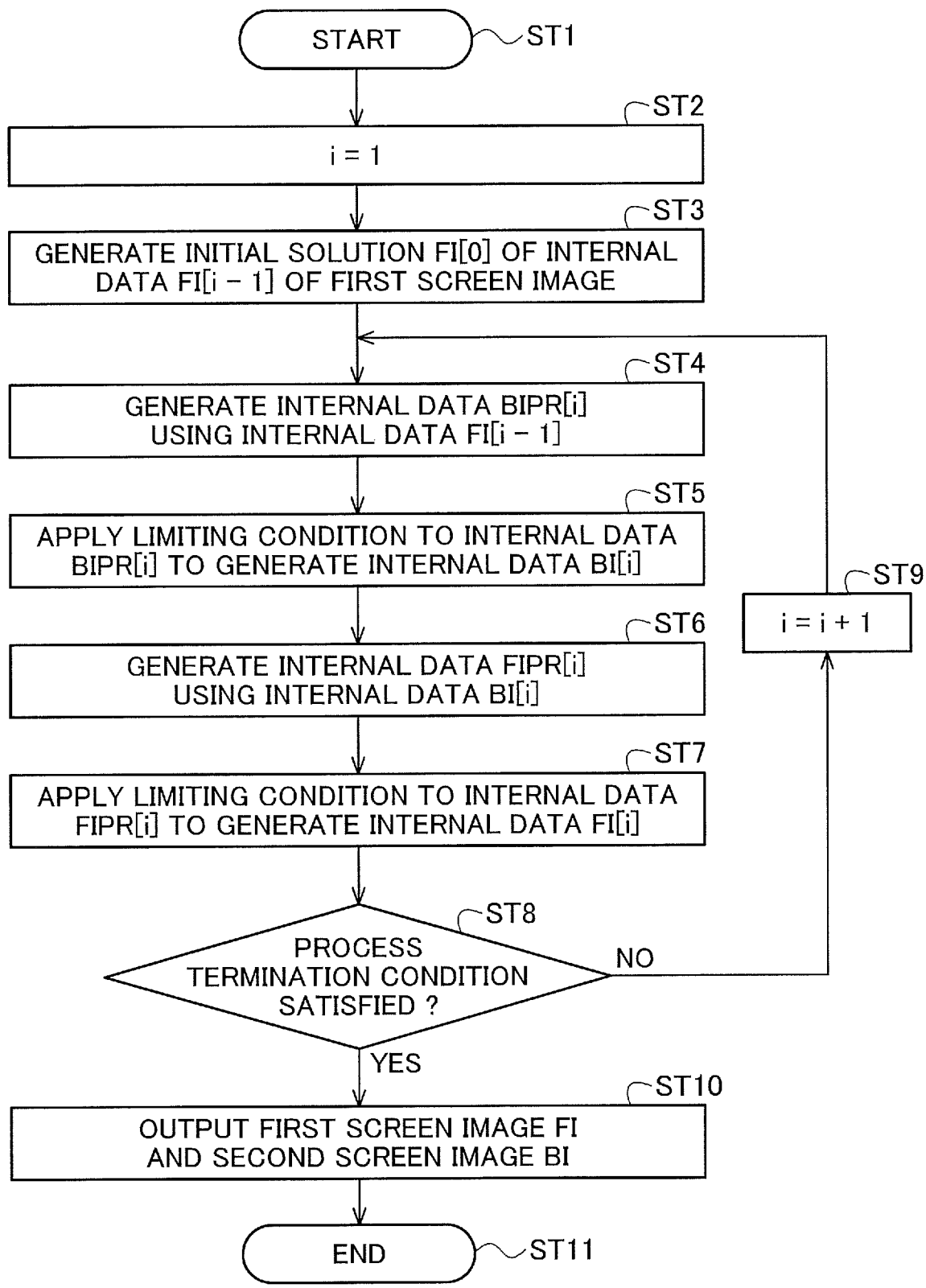
FIG. 6 is a flowchart illustrating a flow of a process in the image processing apparatus 24 of each of the first and second embodiments.

FIG. 6 is a flowchart illustrating a flow of a process in the image processing apparatus 24. The flow from the start (ST1) of the process to the end (ST11) of the process will be described together with the configuration of FIG. 5. Each element will be described in detail later.

The input unit 10 receives, as an input, multi-view images, e.g., binocular parallax images obtained by capturing an object. The binocular parallax images consist of a left-eye image L and a right-eye image R. Typically, an image indicates a gray level value of each pixel. The gray level values are processed after being converted, through gamma conversion or the like, into values linear to brightness displayed by the 3D image display apparatus 20.

The initial solution generator 11 sets an increment variable i for controlling an iterative process to 1 (ST2). Then, it determines, from the input binocular parallax images, an initial solution FI[0] that is internal data of an image for the first screen 31 (ST3). The initial solution generator 11 generates, from data of multiple input images, internal data of screen images to be displayed on screens excluding internal data of one end image. Here, the "internal data of one end image" is BI[i], and the "internal data of screen images to be displayed on screens excluding internal data of one end image" is FI[0]. The end image refers to the foremost or rearmost image of the layered image.

The layered image generator 12 receives, in the initial step, the binocular parallax images and the initial solution FI[0] generated by the initial solution generator 11. The layered image generator 12 determines, in the internal data BIPR[i] generator 12a1, internal data BIPR[1] of an image to be displayed on the second screen 32, using the binocular parallax images and initial solution FI[0]. The above can be restated as follows with the increment variable i as 1. The layered image generator 12 determines, in the internal data BIPR[i] generator 12a1, internal data BIPR[i] of an image to be displayed on the second screen 32, using the binocular parallax images and initial solution FI[i−1] (ST4).

The internal data BIPR[i] generator 12a1 then sends the internal data BIPR[i] of the image to be displayed on the second screen 32 to the internal data BIPR[i] limiter 12a2. The internal data BIPR[i] limiter 12a2 applies a limiting condition required for display on the second screen 32 to the internal data BIPR[i] to determine internal data BI[i]. The internal data BIPR[i] limiter 12a2 outputs the internal data BI[i] as an output of the internal data BI[i] generator 12a (ST5).

The internal data BI[i] generator 12a then sends the determined internal data BI[i] to the internal data FIPR[i] generator 12b1. The internal data FIPR[i] generator 12b1 determines internal data FIPR[i] of an image to be displayed on the first screen 31, using the binocular parallax images and internal data BI[i] (ST6).

The internal data FIPR[i] generator 12b1 then sends the determined internal data FIPR[i] of the image to be displayed on the first screen 31 to the internal data FIPR[i] limiter 12b2. The internal data FIPR[i] limiter 12b2 applies a limiting condition required for display on the first screen 31 to the internal data FIPR[i] of the image to be displayed on the first screen 31 to determine internal data FI[i]. The internal data FIPR[i] limiter 12b2 outputs the internal data FI[i] as an output of the internal data FI[i] generator 12b (ST7). The layered image generator 12 generates internal data of each of the screen images, from the limiting condition and the internal data of the screen images to be displayed on the screens excluding the internal data of the one end image. Here, "the internal data of the screen images to be displayed on the screens excluding the internal data of the one end image" is FI[0]. Also here, the "internal data of each of the screen images" is the internal data BI[i] and FI[i].

The internal data FI[i] generator 12b outputs the internal data FI[i] to the iterative process controller 14. The internal data BI[i] generator 12a outputs the internal data BI[i] to the iterative process controller 14. Thus, the layered image generator 12 outputs the internal data FI[i] and BI[i] to the iterative process controller 14. The iterative process controller 14 determines whether the input data satisfies a process termination condition (ST8).

If the iterative process controller 14 determines that the process termination condition is not satisfied, the iterative process controller 14 adds 1 to the increment variable i for controlling the iterative process (ST9), and outputs FI[i] to the layered image generator 12. The layered image generator 12 performs again the processes of ST4, ST5, ST6, and ST7. Each time this iterative process is performed, the layered image generator 12 receives internal data FI[i−1] of the image to be displayed on the first screen 31 and outputs internal data BI[i] of the image to be displayed on the second screen 32 and internal data FI[i] of the image to be displayed on the first screen 31 to the iterative process controller 14. In this manner, until the process termination condition is satisfied, the layered image generator 12 generates new internal data of the multiple screen images from data of the layered image and limiting conditions, in each of one or more rounds of the iterative process after the first round.

If the iterative process controller 14 determines that the process termination condition is satisfied, the internal data FI[i] and BI[i] finally generated at this time are output as the image FI to be displayed on the first screen 31 and the image BI to be displayed on the second screen 32 (ST10), and the process ends (ST11).

The image processing apparatus 24 performs a control for displaying, on the liquid crystal layer 21, the image FI to be displayed on the first screen 31, and a control for displaying, on the liquid crystal layer 22, the image BI to be displayed on the second screen 32. Since the pixel values FI[i] (n) and BI[i] (m) of the internal data generated by the layered image generator 12 are values linear to display brightness, it is preferable to perform display control after converting them into gray level values of images through inverse gamma conversion or the like.

The processes of ST3, ST4, ST5, ST6, ST7, and ST8 will be described in detail below.

<1> ST4: Generation of Internal Data BIPR[i]

The process of generating, in the internal data BIPR[i] generator 12a1, internal data BIPR[i] of the second screen image using the binocular parallax images, and the initial solution FI[0] or internal data FI[i−1] of the first screen image will be described. Similarly to the image FI, for internal data FI[i], a pixel value at horizontal coordinate n will be denoted by FI[i] (n). Similarly to the image BI, for internal data BIPR[i], a pixel value at horizontal coordinate m will be denoted by BIPR[i] (m).

The following two equations are obtained by substituting the pixel values of the images L' and R' viewed through the two screens in Equations 5 and 6 with the pixel values of the left-eye image L and right-eye image R of the binocular parallax images and transforming each of them so that the pixel value BI(x) is on the left-hand side.

$$BI(x)=L(x-s)-FI(x-2 \cdot s) \quad \text{(Equation 7)}$$

$$BI(x)=R(x+s)-FI(x+2 \cdot s) \quad \text{(Equation 8)}$$

If the pixel values FI[i](x) and BI(x) can be determined so that Equations 7 and 8 are satisfied, it is possible to display the binocular parallax images by the 3D image display apparatus 20.

In Equations 7 and 8, L(x−s) and R(x+s) can be determined from the input left-eye image L and right-eye image R. The pixel values FI(x−2·s) and FI(x+2·s) can be determined from the initial solution FI[0] generated in ST3 or the internal data FI[i−1] generated in ST7. Thus, for the pixel value BI(x), two values can be obtained from Equations 7 and 8.

The pixel value BI(x) can take only one value, and the pixel value BI(x) satisfying both Equations 7 and 8 is obtained only when the pixel values BI(x) obtained from Equations 7 and 8 are equal to each other.

Thus, an average of the two values obtained from Equations 7 and 8 is determined as the pixel value BI(x). The internal data BIPR[i](x) can be calculated as in Equation 9 using the above method.

$$\text{(Equation 9)}$$
$$BIPR[i](x) = \frac{\{L(x-s)-FI[I-1](x-2 \cdot s)\} + \{R(x+s)-FI[I-1](x+2 \cdot s)\}}{2}$$

The internal data BIPR[i](x) can be calculated by using Equation 9 to determine values for all the pixels in the image to be displayed on the second screen.

<2> ST6: Generation of Internal Data FIPR[i]

The process of generating, in the internal data FIPR[i] generator 12b1, internal data FIPR[i] using the binocular parallax images and internal data BI[i] will be described. The following two equations are obtained by substituting the pixel values of the images L' and R' viewed through the two screens in Equations 7 and 8 with the pixel values of the left-eye image L and right-eye image R of the binocular parallax images and transforming each of them so that the pixel value FI(x) is on the left-hand side.

$$FI(x)=L(x+s)-BI(x+2 \cdot s) \quad \text{(Equation 10)}$$

$$FI(x)=R(x-s)-BI(x-2 \cdot s) \quad \text{(Equation 11)}$$

If the pixel values FI(x) and BI(x) can be determined so that Equations 10 and 11 are satisfied, it is possible to display the binocular parallax images by the 3D image display apparatus 20.

In Equations 10 and 11, the pixel values L(x+s) and R(x−s) can be determined from the input pixel values of the left-eye image L and right-eye image R. The pixel values BI(x+2·s) and BI(x−2·s) can be uniquely determined using the internal data BI[i] generated in ST5. Thus, for the pixel value FI(x), two values can be obtained from Equations 10 and 11.

The pixel value FI(x) can take only one value, and the pixel value FI(x) satisfying both Equations 10 and 11 is obtained only when the pixel values FI(x) obtained from Equations 10 and 11 are equal to each other.

Thus, an average of the two values obtained from Equations 10 and 11 is determined as the pixel value FI(x). The internal data FIPR[i](x) can be calculated as in Equation 12 using the above method.

$$\text{(Equation 12)}$$
$$FIPR[i](x) = \frac{\{L(x+s)-BI[i](x+2 \cdot s)\} + \{R(x-s)-BI[i](x-2 \cdot s)\}}{2}$$

The internal data FIPR[i] can be calculated by using Equation 12 to determine values for all the pixels in the image to be displayed on the first screen.

<3> ST5 and ST7: Application of Limiting Condition

The internal data BIPR[i] limiter 12a2 applies the limiting condition required for display on the second screen 32 to the internal data BIPR[i] generated by the internal data BIPR[i] generator 12a1. Likewise, the internal data FIPR[i] limiter 12b2 applies the limiting condition required for display on the first screen 31 to the internal data FIPR[i] generated by the internal data FIPR[i] generator 12b1.

In this embodiment, the liquid crystal layers are used as the first screen 31 and second screen 32. When a liquid crystal layer is used, it is possible to change the polarization angle with respect to polarized light passing through the liquid crystal layer, but its range is limited to 0 to 90 degrees.

Also, the change of the polarization angle is limited to addition, and no change in a negative direction by subtraction is possible.

This is applied to the internal data FIPR[i] and BIPR[i] as the limiting condition. Specifically, when the displayable brightness range of a liquid crystal layer is from a minimum brightness value (or brightness limit minimum value) MinB to a maximum brightness value (or brightness limit maximum value) MaxB, a clipping process is performed so that if a value FIPR[i](n) or BIPR[i](m) is outside the range corresponding to the range from the minimum brightness value MinB to the maximum brightness value MaxB, the value is limited to a value corresponding to the minimum brightness value MinB or maximum brightness value MaxB.

The following is an example of the clipping process. When it is assumed that the value corresponding to the minimum brightness value MinB is 0.0 and the value corresponding to the maximum brightness value MaxB is 1.0, a limiting condition application unit 13 performs the following process on all the pixels of the internal data FIPR[i] and BIPR[i].

clip(*x*): *x*=1 when *x*>1

*x*=0 when *x*<0

*x*=*x* otherwise         (Formula 13)

If no limiting condition is applied in ST5 and ST7, the internal data BIPR[i] and FIPR[i] obtained in ST4 and ST6 may exceed the display dynamic ranges of the liquid crystal layers, and thus the pixel values of the images FI and BI output from ST10 may also exceed the display dynamic ranges of the liquid crystal layers. To display them on the liquid crystal layers 21 and 22, it is necessary to perform the clipping process represented by Formula 13 or a dynamic range reduction process that converts the minimum values and maximum values to the values corresponding to the minimum brightness value MinB and maximum brightness value MaxB, respectively.

If the clipping process is performed in or after ST10, gradation loss, which is a phenomenon in which a part of an image becomes solid, occurs. In a part where gradation loss has occurred, binocular parallax images cannot be displayed in the left-eye and right-eye directions. This interferes with stereoscopic perception of the viewer.

If the dynamic range reduction process is performed in or after ST10, there is a problem in that the contrast of the displayed image deteriorates.

By applying the limiting conditions as shown in FIG. 6 each time the internal data BIPR[i] and FIPR[i] are determined, it is possible to prevent deterioration in contrast of the finally displayed image.

When the limiting conditions are applied each time the internal data BIPR[i] and FIPR[i] are determined, gradation loss occurs at the time of application of the limiting conditions. However, since based on internal data FIPR[i] and BIPR[i] in which gradation loss has occurred, the iterative process generates FI[i] and Bi[i] and further generates BIPR[i+1] and FIPR[i+1], it is possible to disperse the part in which gradation loss has occurred, thereby making it less likely to interfere with stereoscopic perception of the viewer.
<4> ST3: Generation of initial solution FI[0]

The initial solution generator 11 generates, from the input binocular parallax images (left-eye image and right-eye image), the initial solution FI[0], which is internal data of an image of the first screen 31.

One method of generating the initial solution FI[0] is to determine, as FI[0], one of the left-eye image L and right-eye image R.

Another method of generating the initial solution FI[0] is to determine, as the initial solution FI[0], an average of the left-eye image L and right-eye image R. That is, the initial solution is set to an average of data of multiple different input images.

Still another method of generating the initial solution FI[0] is to extract only a common component included in the left-eye image L and right-eye image R. Specifically, a difference between pixels at the same coordinates in the left-eye image L and right-eye image R may be determined; if the difference is 0, the gray level of the pixels may be employed in the initial solution FI[0], and if the difference is not 0, a gray level value 0 may be employed in the initial solution FI[0].

The determination of the internal data BI[1] from the left-eye image L, right-eye image R, and initial solution FI[0] by using Equation 9 in the first round of ST4 is interpreted as follows: The first member of the numerator is a difference obtained by subtracting the initial solution FI[0] from the left-eye image L; the second member of the numerator is a difference obtained by subtracting the initial solution FI[0] from the right-eye image R; an average of these differences is determined as the internal data BI[1]. For example, when only a common component included in the left-eye image L and right-eye image R is extracted and set as the initial solution FI[0], a parallax component of the binocular parallax images appears in the internal data BI[1]. When the binocular parallax images are represented using the internal data FI[i] and BI[i], representation of the parallax component is important.

After the internal data BI[1] is determined in ST4, the limiting condition is applied to the internal data BI[1] in ST5. Here, by performing the clipping process, negative values are rounded to 0.

From the above, it is desirable to generate the initial solution FI[0] so that a negative component is less likely to appear in the internal data BI[1]. One method of realizing this is to determine only the common component included in the left-eye image L and right-eye image R as the initial solution FI[0]. By making a negative component less likely to appear in the internal data BI[1], the parallax component of the binocular parallax images is made less likely to be rounded to 0 by application of the limiting condition, and consequently the binocular parallax images are more likely to be properly represented by the internal data FI[i] and BI[i].

Further, by properly generating the initial solution FI[0], it becomes possible to satisfy the process termination condition with a small number of iterations (or rounds) of the iterative process.

It is desirable that the initial solution FI[0] be determined under the limiting condition required for display on the first screen 31. Although not illustrated in FIG. 5, it is possible to perform the process by the layered image generator 12 after applying, in the limiting condition application unit 13, the limiting condition indicated by Formula 13 to the initial solution FI[0] generated by the initial solution generator 11. However, when the initial solution FI[0] is generated by the aforementioned method, since the initial solution FI[0] is determined naturally within the range of the limiting condition, applying Formula 13 to the initial solution FI[0] causes no change.

<5> ST8: Setting of Process Termination Condition

As evaluation of the process termination condition performed by the iterative process controller 14, it is possible to determine, using the generated internal data FI[i] and BI[i], the images L' and R' viewed by both eyes of the viewer, further determine differences between the images L' and R' and the binocular parallax images L and R to be displayed, and evaluate a condition that both the differences are below a predetermined value. In this case, the binocular parallax images L and R need to be input to the iterative process controller 14.

It is also possible to determine a difference between the generated internal data FI[i] and the internal data FI[i−1] generated in the previous round, and evaluate a condition that the difference is below a predetermined value.

Likewise, it is possible to determine a difference between the generated internal data BI[i] and the internal data BI[i−1] generated in the previous round, and evaluate a condition that the difference is below a predetermined value.

Further, it is possible to evaluate a condition that both of the difference between the internal data FI[i] and FI[i−1] and the difference between the internal data BI[i] and BI[i−1] are below a predetermined value.

As the predetermined values, arbitrary values may be used.

Figure 7:
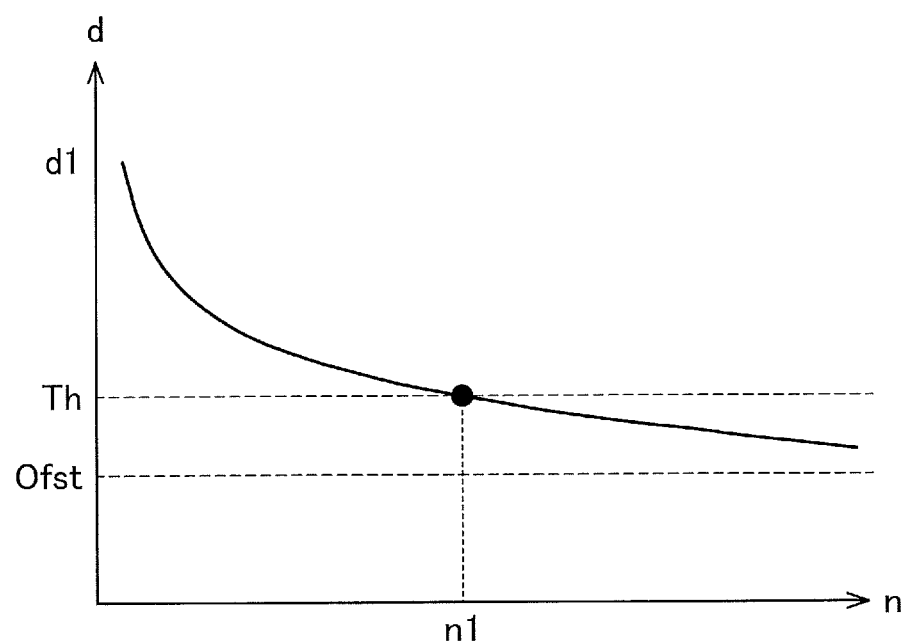
FIG. 7 is an explanatory diagram illustrating a relationship between a difference and the number of iterations of an iterative process, in the first embodiment.

FIG. 7 is an explanatory diagram illustrating a relationship between a difference between the image L' and the binocular parallax image L and the number of iterations of the iterative process, in the first embodiment. FIG. 7 has a horizontal axis indicating the number n of iterations of the iterative process. FIG. 7 has a vertical axis indicating the difference d. As illustrated in FIG. 7, the difference d represents a curve such that as the number of iterations of the iterative process increases, the difference d decreases to gradually approach an offset value Ofst from an initial difference d1 when n=1. With respect to this curve, a threshold value Th is set as the predetermined value, and when the difference d falls below the threshold value Th, that is, when the number of iterations of the iterative process is n1, the process termination condition is satisfied.

In the iterative process controller 14, as the number of iterations of the iterative process increases, more accurate screen images are obtained. Thus, as the threshold value Th set as the predetermined value decreases, the number of iterations of the iterative process increases, and more accurate screen images are obtained, but the amount of processing increases. Conversely, as the threshold value Th set as the predetermined value increases, the number of iterations of the iterative process decreases, and the amount of processing also decreases, but the accuracy of the screen images decreases. As above, by adjusting the predetermined value, it is possible to control the amount of processing and the accuracy of the screen images.

However, when an arbitrary value is used as the predetermined value, there is a problem in that, since the magnitude of the difference depends on the input binocular parallax images, the number of iterations of the iterative process until termination of the process varies greatly with the input binocular parallax images.

The input-output characteristic (shape) of the curve illustrated in FIG. 7 does not vary greatly with the input binocular parallax images. However, the absolute values of the initial difference d1 and offset value Ofst may vary greatly with the input binocular parallax images. Thus, if a predetermined value is set as the threshold value Th, the number of iterations of the iterative process until the process termination condition is satisfied may be abnormally large or small depending on the input images, and consequently the accuracy of the screen images varies.

When a difference between the internal data FI[i] and FI[i−1] or a difference between the internal data BI[i] and BI[i−1] is used instead of the difference between the image L' and the binocular parallax image L or the difference between the image R' and the binocular parallax image R, the offset value Ofst is a small value close to 0, but the absolute value of the initial difference d1 may be large depending on the input binocular parallax images.

To solve this problem, for example, for the internal data FI[i], with a difference between FI[2] and FI[1] as a reference, a value obtained by multiplying the difference by a ratio may be used as the predetermined value. Likewise, for the internal data BI[i], with a difference between BI[2] and BI[1] as a reference, a value obtained by multiplying the difference by a ratio may be used as the predetermined value.

As in the case of using an arbitrary value as the predetermined value, as the aforementioned ratio increases, the number of iterations of the iterative process until the process termination condition is satisfied decreases. As the aforementioned ratio decreases, the number of iterations of the iterative process until the process termination condition is satisfied increases. However, in this case, accurate screen images are obtained.

By employing, as the predetermined value, a value obtained by multiplying the difference obtained initially in the iterative process by the ratio, it is possible to appropriately set the threshold value Th with respect to the curve illustrated in FIG. 7, regardless of the absolute value of the initial difference d1. The variation of the number of iterations of the iterative process until the process termination condition is satisfied with the input images decreases, and consequently the accuracy of the screen images stabilizes. Thus, the balance between the amount of processing of the iterative process and a desired accuracy of the screen images is easy to maintain.

As the process termination condition of the iterative process controller 14, the iterative process may be performed a set number of iterations (e.g., five times). This can make the amount of processing of the iterative process constant.

Although the pixels in the single line extending in the horizontal direction on each screen have been described in FIGS. 3 and 4, the same process is applied to the pixels in all the lines. The internal data FI[i] and BI[i] are obtained by performing the process on all the lines.

The first embodiment has described the apparatus and method that displays the binocular parallax images using the stack of two screens. The present invention enables perception of a 3D image beyond the two screens. An object to be perceived is not limited to simple figures, and binocular parallax images, such as natural images, having complex depth information can also be displayed.

In a method (e.g., Non Patent Literature 1) capable of representing depth beyond a space between screens, equations given by Equations 7 and 8 are set up for all the pixels of images, with the pixel values of a front screen and a rear screen as variables. Considering the group of equations as simultaneous linear equations with multiple unknowns, the method solves them using an optimization algorithm, such as a least-squares method. The number of the variables is twice the number of the pixels, and a large linear least-squares problem is solved. Further, since liquid crystal displays are used as the displays, it is necessary to perform the optimization with a limiting condition. Although a method that uses a Jacobian matrix multiplication function to perform optimization with a limiting condition using less memory resources has been proposed, it requires a complicated process as compared with the present invention, and requires expensive hardware, such as a GPU, to quickly determine FI and BI.

On the other hand, the present invention determines the image FI to be displayed on the first screen and the image BI to be displayed on the second screen by iterating the processes shown in Equations 9 and 12, in order to represent the binocular parallax images using the layered screens. The processes shown in Equations 9 and 12 are each a process of shifting and subtracting an image and determining an average, and each can be said to be a simple and plain process.

Further, the process flow illustrated in FIG. 6 is a process suitable for performing sequential processing on the pixels of the images input along a scanning direction. Since it is suitable for sequential processing, it can be implemented using a low-capacity static random access memory (SRAM) instead of a high-capacity dynamic random access memory (DRAM), in a field programmable gate array (FPGA), an application specific integrated circuit (ASIC), or the like.

It can also be implemented as software running on a microcomputer, instead of hardware, such as an FPGA or ASIC.

In the present invention, the limiting condition is applied in each round of the iterative process. Thus, the iterative process is performed within the range within which images can be represented, which makes it possible to determine the images FI and BI without degrading the contrast of images viewed by the viewer.

As a polarization film configuration for liquid crystal layers other than that of the present embodiment, for example, in Non Patent Literature 1, polarization films are disposed not only at a foremost surface and a rearmost surface of a stack of liquid crystal layers but also between the stacked liquid crystal layers so that the polarization films are different in angle by 90 degrees in order from the rearmost surface. In this stacking manner, each of the stacked liquid crystal layers attenuates the intensity of light, and the intensity of light reaching the eyes of a viewer is determined by multiplying the optical transmittances of the respective liquid crystal layers. By taking advantage of the fact that a multiplication equation can be transformed into an addition equation by taking the logarithm, it is possible to represent light reaching the eyes of the viewer 25 by an equation similar to that in the case of the addition of the polarization angles.

When light reaching the eyes can be represented by an addition equation, the present technique is applicable. Thus, a configuration, such as the aforementioned one, of polarization films for liquid crystal layers other than that of the present embodiment may be employed.

The present technique is also applicable when two screens are displayed in a superposed manner using a half mirror or the like. The use of the half mirror allows light reaching the eyes to be represented by addition of the brightnesses of the two screens. The use of a half mirror allows display apparatuses other than liquid crystal displays, e.g., non-transmissive display apparatuses, such as organic EL displays or plasma displays, to perform layered display.

In this embodiment, the initial solution generator 11 determines the internal data FI[0] of the first screen image as the initial solution of the iterative process. Thereby, the parallax component included in the binocular parallax images tends to appear in the internal data BI[1] of the second screen image. Thus, the parallax component tends to appear in the image BI to be displayed on the second screen.

The parallax component is a component corresponding to the difference between the left-eye image L and the right-eye image R, and appears as double images. Displaying an image including double images on the first screen, which is located on the side near the viewer, may deteriorate visibility. Displaying an image including double images on the second screen, which is located on the side far from the viewer, can suppress deterioration in visibility.

If this is acceptable, it is possible to determine internal data BI[0] of the second screen image instead of FI[0] in the initial solution generator 11, and in the subsequent processing, replace ST4 and ST6 with each other, determine FI[1] from BI[0], apply a limiting condition to determine FIc[1], determine BI[1] from FIc[1], and apply a limiting condition to determine BIc[1]. At this time, the internal data BI[0] of the second screen image can be determined in the same way as the internal data FI[0] of the first screen image, for example.

Second Embodiment

In a second embodiment, a 3D image display apparatus having an extended view range within which an viewer has stereoscopic perception will be described. The configuration of the 3D image display apparatus of the second embodiment is the same as that described in the first embodiment, so its description will be omitted, and only parts differing from those of the first embodiment will be described.

In the first embodiment, a method of displaying binocular parallax images to the left and right eyes of a viewer has been described. In this case, there is a problem in that the view range within which the viewer can have stereoscopic perception is limited to a range in front of the 3D image display apparatus 20.

By receiving binocular parallax images and a central viewpoint image, and generating the images FI and BI so that images of three viewpoints are displayed in directions of the left and right eyes of a viewer and a central direction, it is possible to extend the view range within which the viewer can have stereoscopic perception.

A central viewpoint refers to a viewpoint when it is assumed that there is an eye in the center between the left and right eyes of an viewer. The central viewpoint image refers to an image obtained by capturing an object from the central viewpoint.

Figure 8:
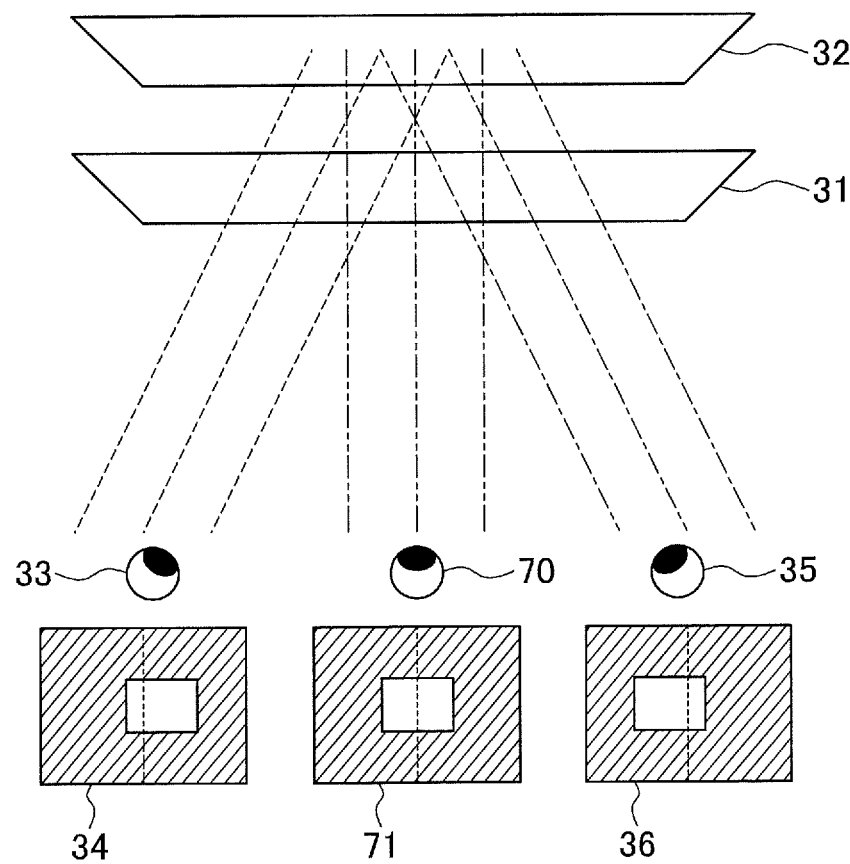
FIG. 8 is an explanatory diagram illustrating a situation where binocular parallax images and a central viewpoint image are displayed using a stack of screens, in the second embodiment.

FIG. 8 illustrates a situation where binocular parallax images and a central viewpoint image are displayed using a stack of screens. In FIG. 8, in addition to the left-eye and right-eye directions illustrated in FIG. 2, a central viewpoint image 71 can be viewed from a central viewpoint 70. A method of viewing the central viewpoint image 71 from the central viewpoint 70 in addition to the left-eye and right-eye directions will be described below.

In the second embodiment, binocular parallax images (a left-eye image L and a right-eye image R) and a central viewpoint image C are input to the input unit 10 of the image processing apparatus 24. Then, the images FI and BI are generated by performing the process of the flowchart illustrated in FIG. 6 in the initial solution generator 11, layered image generator 12, limiting condition application unit 13, and iterative process controller 14, and the liquid crystal layers 21 and 22 are controlled to display them.

<1> ST4: Generation of Internal Data BI[i]

A process of generating, in the internal data BIPR[i] generator 12a1, internal data BI[i] using the binocular parallax images and the initial solution FI[0] or internal data FI[i] will be described.

Figure 9:
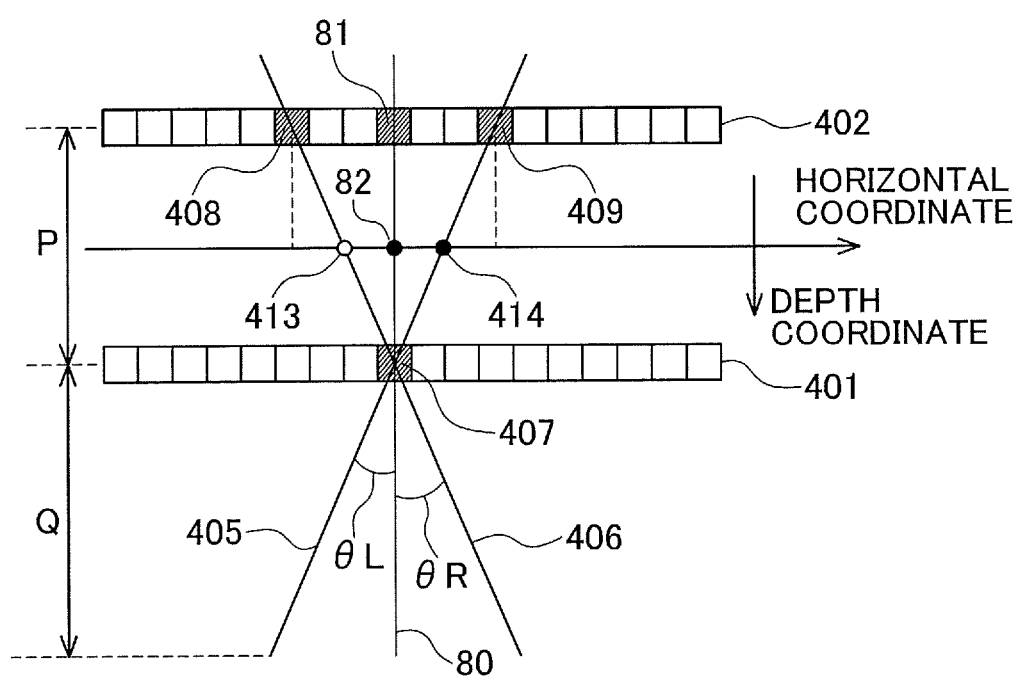
FIG. 9 is an explanatory diagram depicting images viewed from an angle θL, an angle θR, and a central viewpoint direction θC in the 3D image display apparatus 20 of the second embodiment, in terms of pixels of the stacked screens.

FIG. 9 is obtained by adding an image viewed from a central viewpoint direction θC to FIG. 3, which represents the images viewed from the angles θL and θR in terms of pixels of the stacked screens. θC is an angle of substantially 0°.

Light in the central viewpoint direction θC depends on rotation of polarized light at the pixel 407 and a pixel 81 on a line of sight 80. The position of the central viewpoint image viewed on the line of sight 80 is a projection point 82, and the pixel value thereof will be denoted by C(x). If the pixel value C(x) satisfies the following relationship, it is possible to display the central viewpoint image C in the central viewpoint direction θC using the stack of screens. Internal data of the pixel value C(x) will be denoted by C[i](x).

$$C[i](x)=FI[i](x)+BI[i](x) \quad \text{(Equation 14)}$$

Transforming Equation 14 gives Equation 15.

$$BI[i](x)=C[i](x)-FI[i](x) \quad \text{(Equation 15)}$$

If BI(x) can be determined so that Equation 15 is satisfied in addition to Equations 7 and 8 described in the first embodiment, it is possible to display the binocular parallax images and central viewpoint image by the 3D image display apparatus 20.

As in the first embodiment, the right-hand sides of Equations 7, 8, and 15 can be uniquely determined. On the other hand, BI[i](x) can take only one value, and it is necessary to use three values obtained from the three equations to determine the pixel value BI[i](x) of the internal data to be calculated. One method is to determine an average of the three values as the pixel value BI[i](x) of the internal data.

$$BI[i](x) = \frac{\{L(x-s) - FI[i](x-2 \cdot s)\} + \{R(x+s) - FI[i](x+2 \cdot s)\} + \{C(x) - FI[i](x)\}}{3} \quad \text{(Equation 16)}$$

Another method is to determine a weighted average of the three values. When a weight for the left-eye image L is α, a weight for the right-eye image R is 1, and a weight for the central viewpoint image C is Y, the pixel value BI[i](x) of the internal data determined by weighted average calculation is given by the following equation.

$$BI[i](x) = \frac{\alpha \times \{L(x-s) - FI[i](x-2 \cdot s)\} + \beta \times \{R(x+s) - FI[i](x+2 \cdot s)\} + \gamma \times \{C(x) - FI[i](x)\}}{(\alpha + \beta + \gamma)} \quad \text{(Equation 17)}$$

The weights in determining the weighted average is weights for the respective images reflected in the pixel value BI[i](x) of the internal data. For example, when the weights α and β are set to different values, the binocular parallax images are weighted differently from each other and reflected in the pixel value BI[i](x) of the internal data, and thus the pixel value BI[i](x) of the internal data may inaccurately reproduce the parallax. Thus, it is desirable that the weights α and β be set to the same value.

It is desirable that the weight Y be set to a value less than or equal to the weight α or β. When the weight I is large, a component of the binocular parallax images reflected in the pixel value BI[i](x) of the internal data may be small. At this time, the viewer perceives a stereoscopic effect weaker than the original stereoscopic effect included in the binocular parallax images.

The internal data BI[i] can be calculated by using Equation 16, 17, or the like to determine values for all the pixels in the image to be displayed on the second screen.

<2> ST6: Generation of Internal Data FI[i]

A process of generating, in the internal data FIPR[i] generator 12b1, internal data FI[i] using the binocular parallax images and internal data BI[i] will be described. Transforming Equation 14 gives Equation 18.

$$FI[x](x)=CI[i](x)-BI[i](x) \quad \text{(Equation 18)}$$

If the pixel value FI[i](x) of the internal data can be determined so that Equations 10 and 11 described in the first embodiment and Equation 18 are satisfied, it is possible to display the binocular parallax images and central viewpoint image by the 3D image display apparatus 20.

As in the first embodiment, the right-hand sides of Equations 10, 11, and 18 can be uniquely determined. On the other hand, FI[i](x) of the internal data can take only one value, and it is necessary to use three values obtained from the three equations to determine the pixel value FI[i](x) of the internal data to be calculated. One method is to determine an average of the three values as the pixel value FI[i](x) of the internal data.

$$FI[i](x) = \frac{\{L(x+s) - BI[i](x+2 \cdot s)\} + \{R(x-s) - BI[i](x-2 \cdot s)\} + \{C(x) - BI[i](x)\}}{3} \quad \text{(Equation 19)}$$

Another method is to determine a weighted average of the three values. The pixel value FI[i](x) of the internal data determined by weighted average calculation is given by the following equation. For the weights α, β, and γ, it is possible to apply the same condition as in the case of determining the pixel value BI[i](x) of the internal data.

$$FI[i](x) = \frac{\alpha \times \{L(x+s) - BI[i](x+2 \cdot s)\} + \beta \times \{R(x-s) - BI[i](x-2 \cdot s)\} + \gamma \times \{C(x) - BI[i](x)\}}{(\alpha + \beta + \gamma)} \quad \text{(Equation 20)}$$

The internal data FI[i] can be calculated by using Equation 19, 20, or the like to determine values for all the pixels in the image to be displayed on the first screen.

<3> Application of Limiting Condition

It is the same as in the first embodiment, so its description will be omitted.

<4> Generation of Initial Solution FI[0]

The initial solution generator 11 generates, from the input binocular parallax images (left-eye image L and right-eye image R) and central viewpoint image C, the initial solution FI[0] to be displayed on the first screen 31 as an initial solution. The initial solution generator 11 generates, from data of multiple input images, internal data of screen images to be displayed on screens excluding internal data of one end image. Here, the "internal data of one end image" is BI[i], and the "internal data of screen images to be displayed on screens excluding internal data of one end image" is FI[0].

One method of generating the initial solution FI[0] is to determine the central viewpoint image C as the initial solution FI[0].

Another method of generating the initial solution FI[0] is to determine, as the initial solution FI[0], an average of the left-eye image L, right-eye image R, and central viewpoint image C.

Still another method of generating the initial solution FI[0] is to use a depth map. The depth map indicates a depth value of each pixel of an image, and indicates values on the depth coordinate axis in FIG. 9. In one method, the depth map can be generated from a parallax distribution that can be calculated from the left-eye image L and right-eye image R. There is a camera capable of simultaneously capturing an image and a depth map of an object, and it is also possible to input the binocular parallax images, central viewpoint image, and depth map to the image processing apparatus 24.

One method of using a depth map is to determine, as the initial solution FI[0], an image obtained by multiplying the gray level of each pixel of the central viewpoint image C by a ratio based on the depth coordinate indicated by the depth map and the distance to the first screen.

By using the depth map, it is possible to set the initial solution so that a front part of an object to be displayed is displayed by the first screen and a rear part of the object is displayed by the second screen. Thereby, it is possible to display a more natural 3D image to the viewer and reduce the number of iterations of the process until the convergence in the iterative process.

<5> Setting of Process Termination Condition

The evaluation of the process termination condition by the iterative process controller 14 may be as follows. First, images L' and R' viewed by both eyes of the viewer and an image C' viewed in the central direction are determined using the generated internal data FI[i] and BI[i]. Then, a difference between the image L' and the parallax image L to be displayed, a difference between the image R' and the parallax image R to be displayed, and a difference between the image C' and the central viewpoint image C to be displayed are determined. Then, a condition that all the differences are below a predetermined value is used as the process termination condition.

The evaluation of the process termination condition may be performed using the same condition as described in the first embodiment.

The second embodiment has described the apparatus and method that displays the binocular parallax images and central viewpoint image using the stack of two screens. The present invention enables perception of a 3D image beyond the two screens, and extension of the view range within which the viewer can have stereoscopic perception.

A reason why the view range is extended is because addition of the central viewpoint image makes the viewer more likely to view the images on the stacked screens in a fused manner.

When the layered image is generated from only the binocular parallax images, an image that can be viewed by the viewer from the central viewpoint θC, which is right in the middle between the angles θL and θR, is not an average of the left-eye image L and right-eye image R, and is an image in which both are mixed. Thus, for example, when the viewer moves to the left so that the right eye of the viewer is located on the line of sight 80 of the central viewpoint θC, the right eye of the viewer views the mixed images, so that the viewer cannot view the images for the left and right eyes in a fused manner and cannot have stereoscopic perception.

Adding the central viewpoint image between the angles θL and θR to the objects to be displayed provides the following advantage. Continuity of display between the angles θL and θR is maintained. When the viewer moves in a left-right direction, the viewer can view a normal image representing an object from the central viewpoint θC, which maintains fusion vision and makes the viewer more likely to have stereoscopic perception. As such, to extend the view range of the viewer, images of more viewpoints may be displayed at fine angle intervals.

On the other hand, displaying images of many viewpoints has the disadvantage of deteriorating image sharpness. The process of determining FI[i] and BI[i] by the layered image generator 12 includes taking an average or a weighted average of the images of the respective viewpoints. A process of taking an average or a weighted average has a low-pass filtering effect, causing image blurring and deterioration in sharpness.

Thus, the second embodiment displays images of the three viewpoints: the left-eye viewpoint, right-eye viewpoint, and central viewpoint. This makes it possible to extend the view range within which the viewer can have stereoscopic perception and perform display while maintaining image sharpness.

The number of display viewpoints is not limited to three. Adding a viewpoint image in a direction of an angle greater than the angle θL or θR has the advantage of extending the view range.

When the number of viewpoints is increased, the magnitudes of the angles between the viewpoints should be paid attention to. When the interval between viewpoints is large, an image interfering with fusion vision is displayed to a viewer between the viewpoints. It is necessary to increase the number of viewpoints with small intervals.

To maintain image sharpness, it is possible to detect the position of a viewer and select viewpoint images to be displayed in accordance with the detected direction of the viewer. In this case, multi-view images and information on the detected viewer's position are input to the image processing apparatus 24 and processed appropriately.

According to the present invention, by employing a simple process with a reduced amount of calculation using the iterative process, it is possible to employ small-scale hardware.

Third Embodiment

In a third embodiment, a 3D image display apparatus obtained by adding a third liquid crystal screen to the apparatus described in the first embodiment will be described. Although the configuration of the 3D image display apparatus of the third embodiment differs from that described in the first embodiment, description of the same elements will be omitted, and only parts differing from those of the first embodiment will be described.

In the first embodiment, a method of displaying binocular parallax images in directions of the left and right eyes of a viewer using two liquid crystal screens has been described.

Adding the third liquid crystal screen increases the number of display pixels existing on a line of sight and increases the number of values that each pixel can take, and thereby can reduce errors in the iterative process, thereby improving the quality of the binocular parallax images perceived by the viewer.

Figure 10:
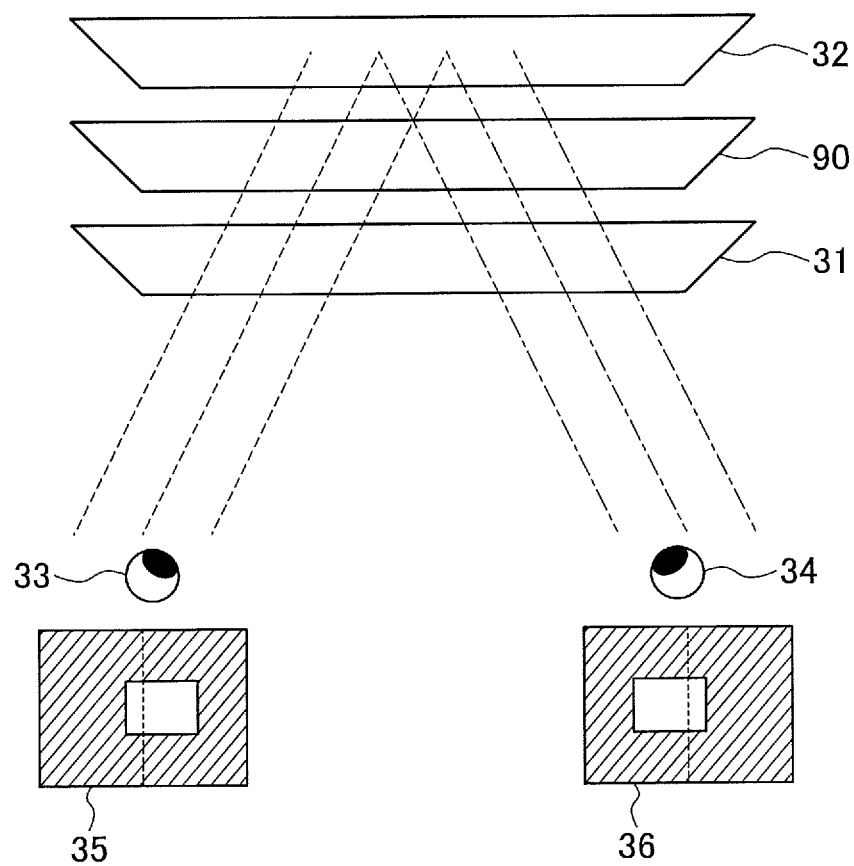
FIG. 10 is an explanatory diagram illustrating a situation where binocular parallax images are displayed using a stack of screens including an additional third liquid crystal layer, in the third embodiment.

FIG. 10 is an explanatory diagram illustrating a situation where binocular parallax images are displayed using a stack of screens including the additional third liquid crystal screen 90. The third screen 90 is disposed between the first screen 31 and second screen 32 used in the first embodiment. Each of lines of sight of the left eye 33 and right eye 34 passes through the first screen 31, third screen 90, and second screen 32 in this order. A processing method of calculating the gray level of each pixel of the first screen 31, third screen 90, and second screen 32 will be described below.

The third screen 90 of the third embodiment is a liquid crystal screen to which no polarization plate is attached, and is disposed between the first screen 31 and the second screen 32. Although not illustrated, a liquid crystal layer having the third screen will be denoted by sign 920. The 3D image display apparatus provided with the additional third liquid crystal screen in the third embodiment will be described using sign 20, which is the same as the sign of the 3D image display apparatus of the first embodiment.

Similarly to the calculation method of the gray levels of the pixels in the first embodiment, the third embodiment also employs a method of calculating an initial solution and sequentially calculating the gray levels of the pixels of each screen. The third embodiment generates, as the initial solution, internal data FI[0] for display on the first screen 31 and internal data MI[0] for display on the third screen 90.

Figure 11:
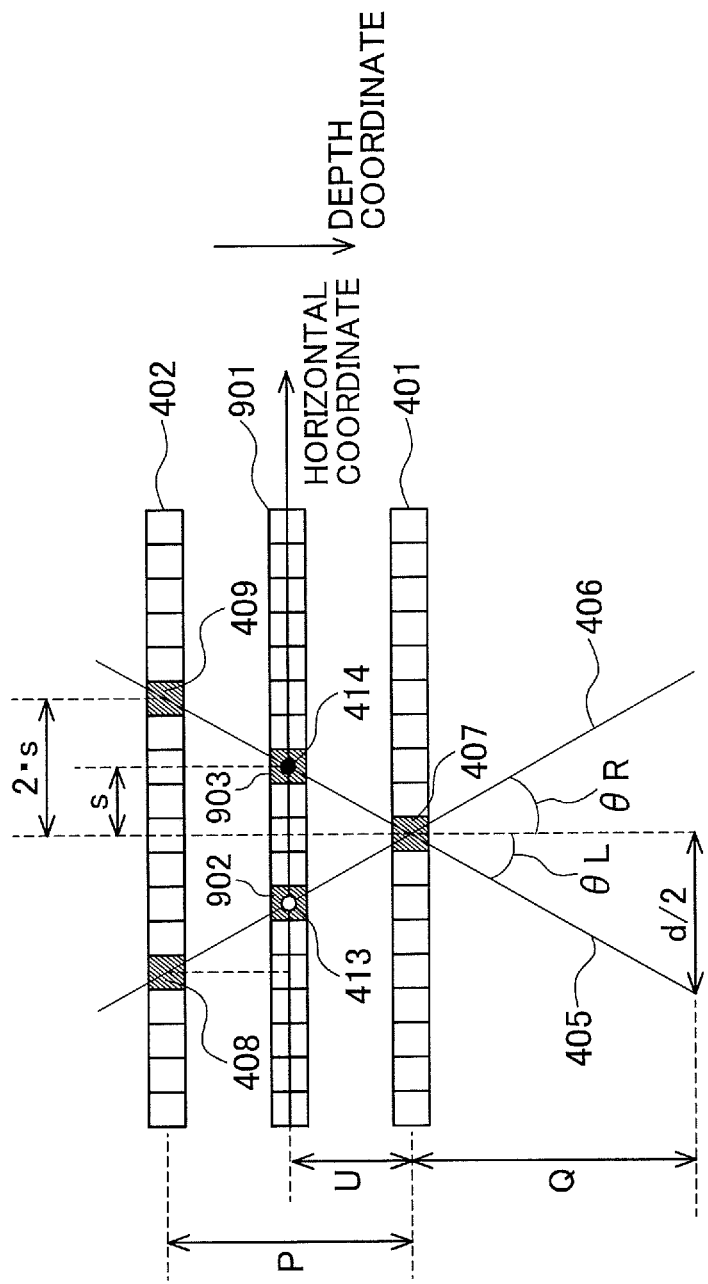
FIG. 11 is an explanatory diagram depicting images viewed from an angle θL and an angle θR in the 3D image display apparatus 20 of the third embodiment, in terms of pixels of the stacked screens.

FIG. 11 is an explanatory diagram illustrating images viewed in a left-eye direction and a right-eye direction in terms of pixels of the stacked screens. FIG. 11 is an overhead view of the 3D image display apparatus 20 as viewed from above. In FIG. 11, the 3D image display apparatus 20 represents images viewed from the angles θL and θR in terms of pixels of the stacked screens. FIG. 11 illustrates the group of pixels 401 of the liquid crystal layer 21, which is the first screen, the group of pixels 402 of the liquid crystal layer 22, which is the second screen, and a group of pixels 901 of the liquid crystal layer 920, which is the third screen. The groups of pixels 401, 402, and 901 are at the same vertical position. In other words, each of the groups of pixels 401, 402, and 901 is a group of pixels on a line aligned in the horizontal direction. The first screen and second screen are stacked at a predetermined interval P, and the first screen and third screen are stacked at a predetermined interval U. That is, it is obtained by adding, at a predetermined position, the group of pixels 901 on the liquid crystal layer 920, which is the third screen, to the 3D image display apparatus illustrated in FIG. 3 described in the first embodiment. The illustration of the backlight 415 is omitted in FIG. 11.

Hereinafter, light viewed through the pixel 407 located at horizontal coordinate x of the group of pixels 401 of the liquid crystal layer 21 will be described with reference to FIG. 11. In the third embodiment, a case where the predetermined interval U is exactly half the predetermined interval P will be described as an example. The predetermined interval U may be other lengths.

Light from the screens to the left eye represented by the line of sight 405 of the left eye depends on rotation of polarized light at the pixel 407, a pixel 903, and the pixel 409 on the line of sight 405. As described in the first embodiment, when the horizontal coordinate of the pixel 407 is assumed to be x, the horizontal coordinate of the pixel 409 on the liquid crystal layer 22, which is the second screen, is given by x+2·s using the distance s obtained by Equation 2. Further, since the predetermined interval U is half the predetermined interval P, the horizontal coordinate of the pixel 903 on the third screen 90 is given by x+s.

As described in the first embodiment, an image to be displayed on the liquid crystal layer 21 will be denoted by FI, and an image to be displayed on the liquid crystal layer 22 will be denoted by BI. A pixel value at horizontal coordinate n that indicates modulation of light due to rotation of polarized light at the pixel of the liquid crystal layer 21 will be denoted by FI(n). A pixel value at horizontal coordinate m that indicates modulation of light due to rotation of polarized light at the pixel of the liquid crystal layer 22 will be denoted by BI(m). In addition, an image to be displayed on the third screen 90 will be denoted by MI, and a pixel value at horizontal coordinate k will be denoted by MI(k).

Similarly to the pixel values FI(n) and BI(m), the pixel value MI(k) is also linear to brightness of light. If the pixel value MI(k) indicates display brightness, it is necessary to perform an inverse gamma conversion having a characteristic opposite to the aforementioned gamma characteristic on them to convert them into gray levels of an image.

As described in the first embodiment, an image viewed on the line of sight 405 of the left eye will be denoted by L', and a pixel value indicating the brightness of a pixel viewed on the line of sight 405 of the left eye will be denoted by L'(x) using its horizontal coordinate x. The image L' has, as its projection plane, a plane that is parallel to the screens, located at depth coordinate 0, and located at a center between the screens. A pixel of the image L' viewed on the line of sight 405 of the left eye is located at the projection point 414, and its horizontal coordinate is given by x+s. In FIG. 11, its depth coordinate coincides with the depth coordinate of the pixels displayed on the third screen 90. If the predetermined interval U is not half the predetermined interval P, their depth coordinates do not coincide. Also, their depth coordinates need not coincide.

From the above, on the line of sight 405 of the left eye, Equation 21 below holds.

$$L'(x+s)=FI(x)+MI(x+s)+BI(x+2 \cdot s) \qquad \text{(Equation 21)}$$

Likewise, light on the line of sight 406 of the right eye depends on rotation of polarized light at the pixel 407, the pixel 408, and a pixel 902 on the line of sight. When the horizontal coordinate of the pixel 407 is assumed to be x, the horizontal coordinate of the pixel 408 is given by x−2·s using the distance s obtained by Equation 2, and the horizontal coordinate of the pixel 902 is given by x−s.

From the above, on the line of sight 406 of the right eye, Equation 22 below holds.

$$R'(x-s)=FI(x)+MI(x-s)+BI(x-2 \cdot s) \qquad \text{(Equation 22)}$$

Equations 21 and 22 show that it is possible to display different images in left and right directions using the stack of three screens.

Similarly to Equations 5 and 6 derived in the first embodiment, Equations 23 and 24 below can be derived from lines of sight (not illustrated) of the left and right eyes passing through the pixel on the second screen 402 located at horizontal coordinate x.

$$L'(x-s)=FI(x-2 \cdot s)+MI(x-s)+BI(x) \qquad \text{(Equation 23)}$$

$$R'(x+s)=FI(x+2 \cdot s)+MI(x+s)+BI(x) \qquad \text{(Equation 24)}$$

However, as described regarding Equations 5 and 6 in the first embodiment, Equation 23 is obtained by substituting x in Equation 21 with x−2·s, and it is obvious that Equation 21 and 23 are substantially the same. Likewise, Equations 22 and 24 are substantially the same.

When the image L' viewed on the line of sight 405 of the left eye and the image R' viewed on the line of sight 406 of the right eye are binocular parallax images, the viewer can perceive a 3D image. To realize this, the image processing apparatus 24 generates the image FI to be displayed on the first screen 31, the image BI to be displayed on the second screen 32, and the image MI to be displayed on the third screen 90 so that input binocular parallax images are converted into the images L' and R'.

Figure 12:
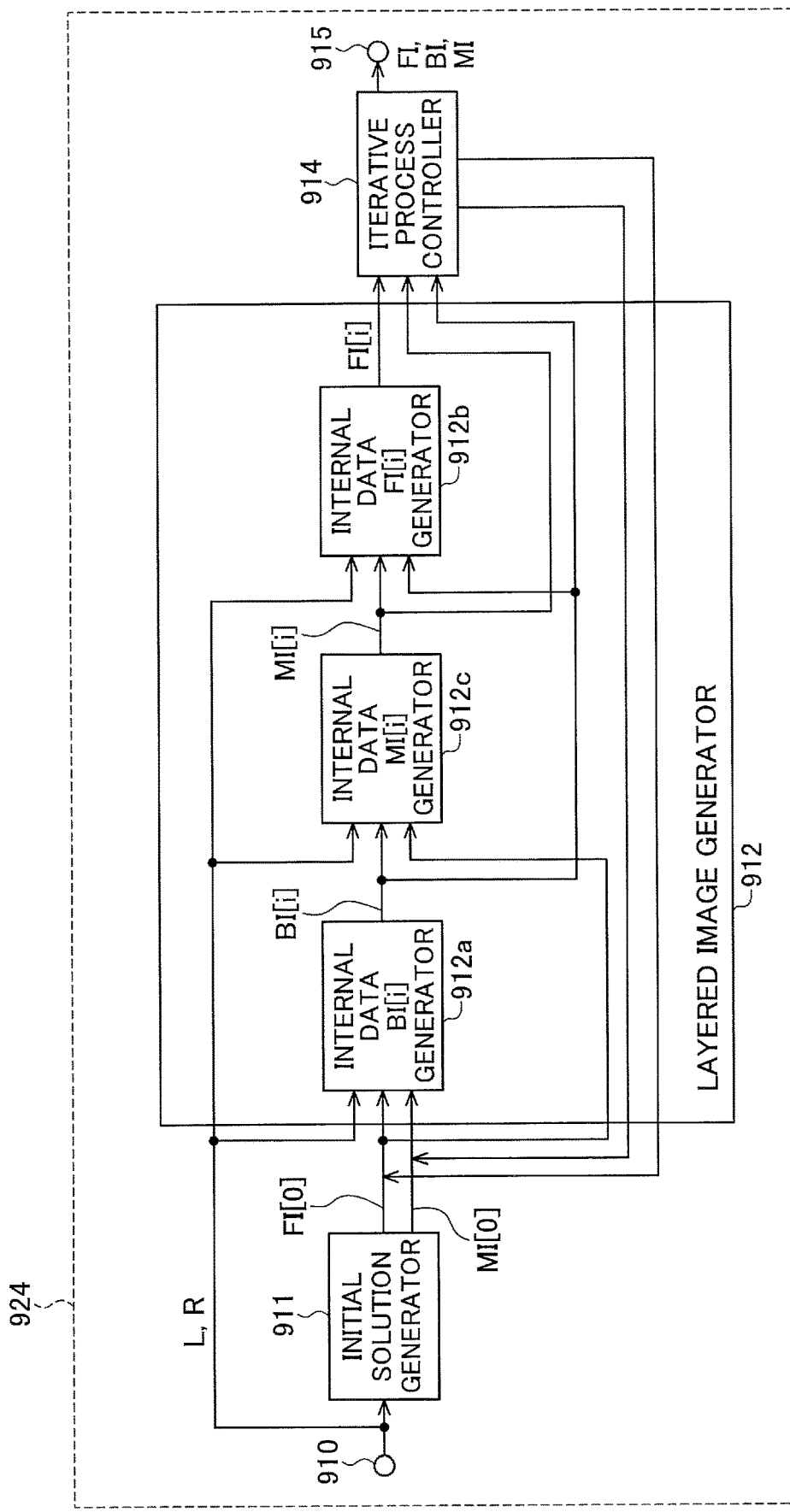
FIG. 12 is a block diagram illustrating a configuration of an image processing apparatus 924 of the third embodiment.
Figure 13:
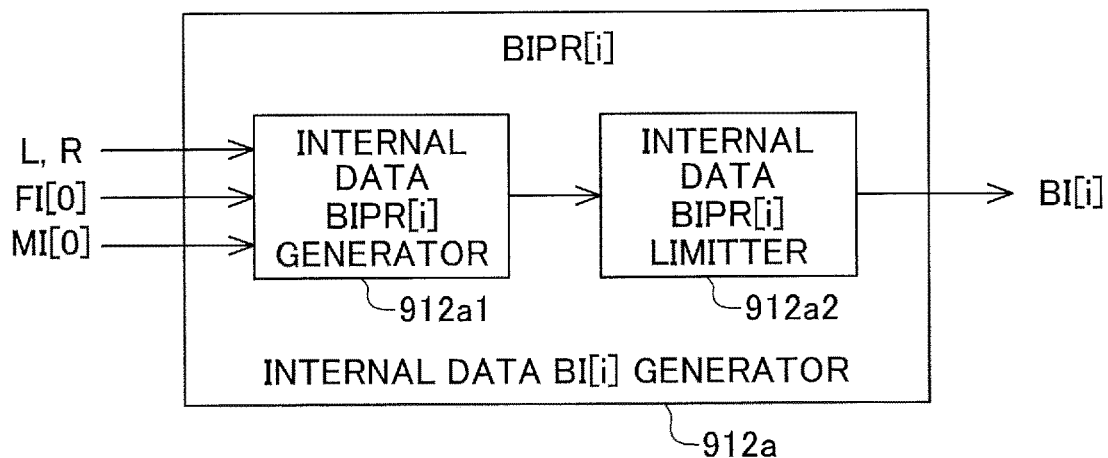
FIG. 13 is a block diagram illustrating a configuration of an internal data BI[i] generator 912a of the third embodiment.
Figure 14:
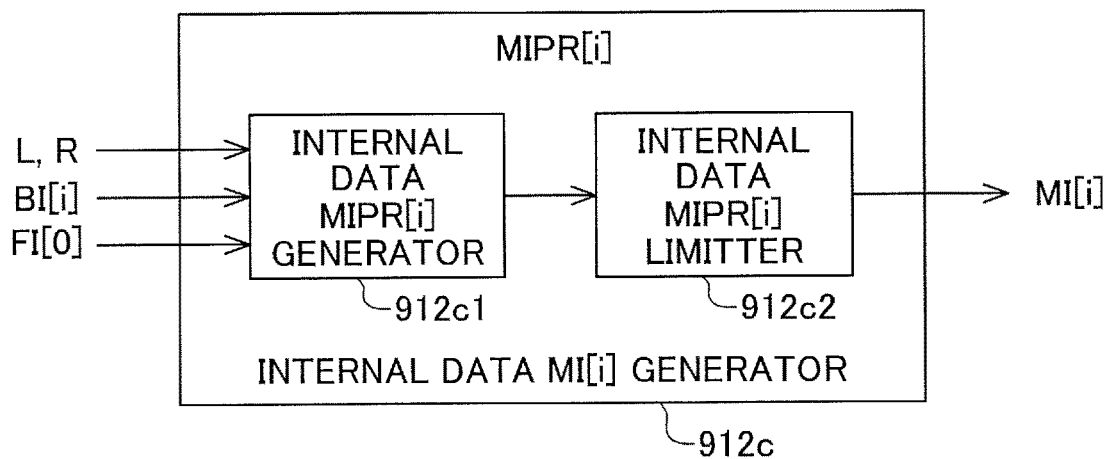
FIG. 14 is a block diagram illustrating a configuration of an internal data MI[i] generator 912b of the third embodiment.
Figure 15:
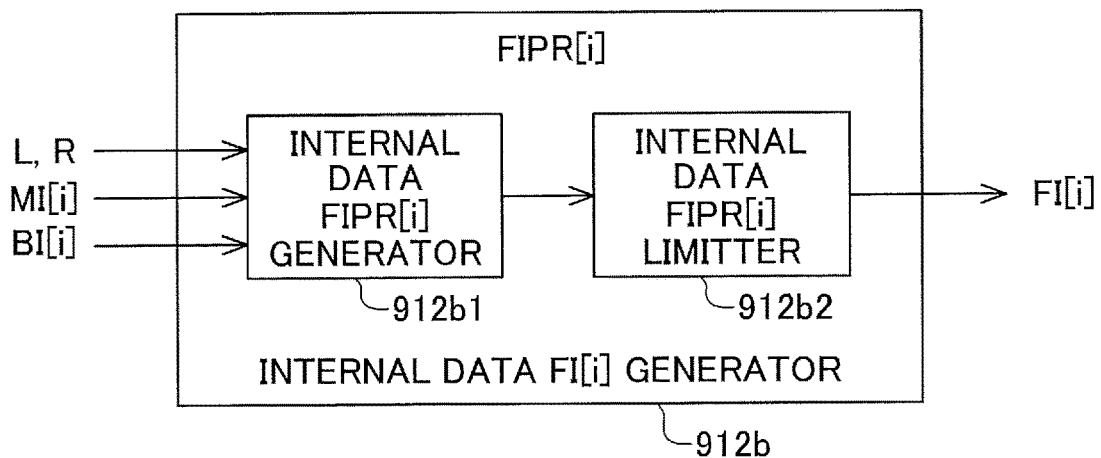
FIG. 15 is a block diagram illustrating a configuration of an internal data FI[i] generator 912c of the third embodiment.

FIG. 12 is a block diagram illustrating a configuration of an image processing apparatus 924. The image processing apparatus 924 includes an input unit 910, an initial solution generator 911, a layered image generator 912, a iterative process controller 914, and an output unit 915. The layered image generator 912 includes an internal data BI[i] generator 912a, an internal data MI[i] generator 912c, and an internal data FI[i] generator 912b. FIG. 13 is a block diagram illustrating a configuration of the internal data BI[i] generator 912a. The internal data BI[i] generator 912a includes an internal data BIPR[i] generator 912a1 and an internal data BIPR[i] limiter 912a2. FIG. 14 is a block diagram illustrating a configuration of the internal data MI[i] generator 912c. The internal data MI[i] generator 912c includes an internal data MIPR[i] generator 912c1 and an internal data MIPR[i] limiter 912c2. FIG. 15 is a block diagram illustrating a configuration of the internal data FI[i] generator 912b. The internal data FI[i] generator 912b includes an internal data FIPR[i] generator 912b1 and an internal data FIPR[i] limiter 912b2.

Figure 16:
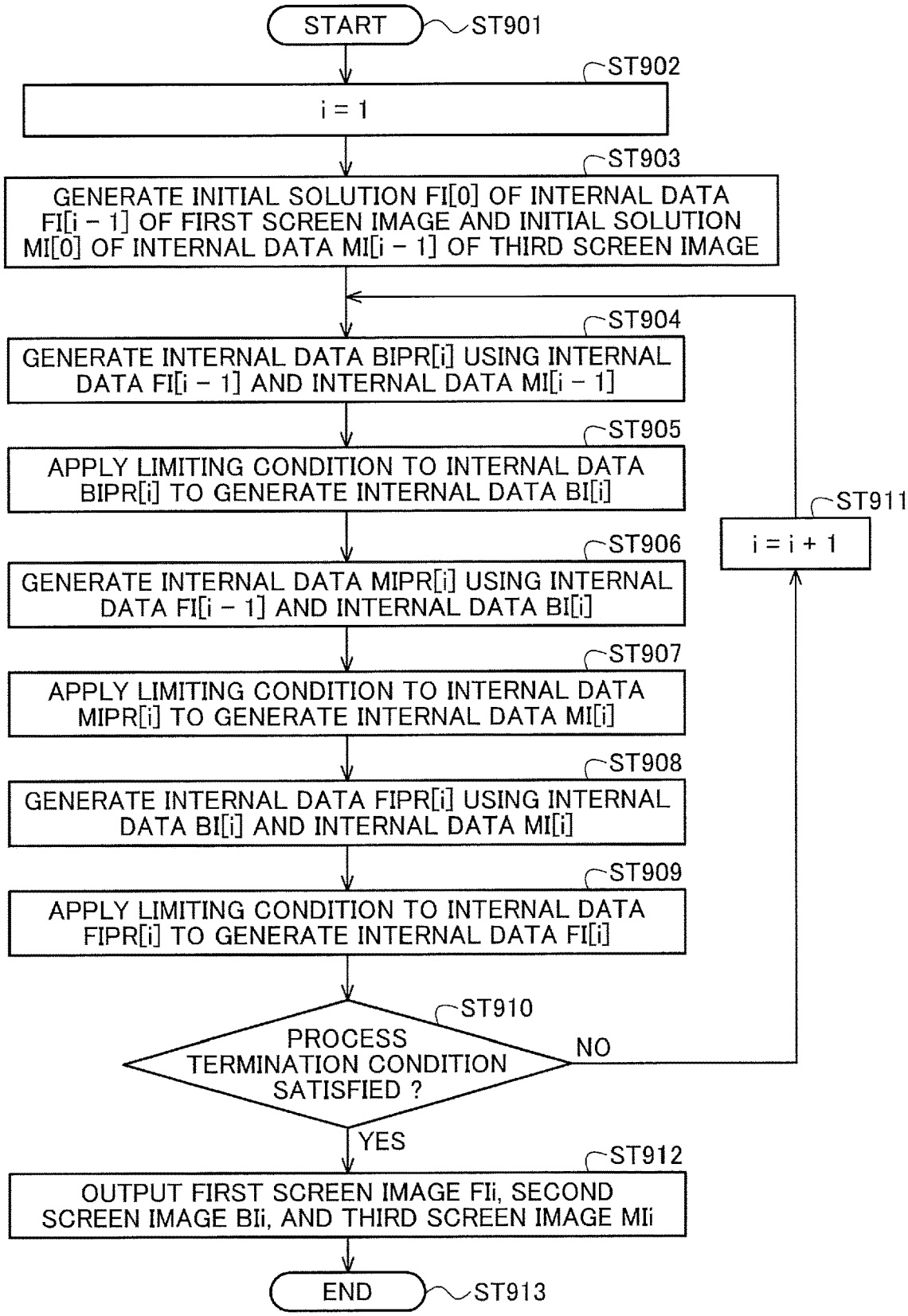
FIG. 16 is a flowchart illustrating a flow of a process in the image processing apparatus 924 of the third embodiment.

FIG. 16 is a flowchart illustrating a flow of a process in the image processing apparatus 924. The flow from the start (ST901) of the process to the end (ST913) of the process will be described together with the configurations of FIGS. 12 to 15. Each element will be described in detail later.

The input unit 910 receives, as an input, multi-view images, e.g., binocular parallax images obtained by capturing an object. The binocular parallax images consist of a left-eye image L and a right-eye image R. Typically, an image indicates a gray level value of each pixel. The gray level values are processed after being converted, through gamma conversion or the like, into values linear to brightness displayed by the 3D image display apparatus 20.

The initial solution generator 911 sets an increment variable i for controlling an iterative process to 1 (ST902). Then, it determines, from the input binocular parallax images, an initial solution FI[0] that is internal data of an image for the first screen 31 and an initial solution MI[0] that is internal data of an image for the third screen 90 (ST903).

The layered image generator 912 receives, in the initial step, the binocular parallax images and the initial solutions FI[0] and MI[0] generated by the initial solution generator 911. The layered image generator 912 determines, in the internal data BIPR[i] generator 912a1, internal data BIPR[1] of an image to be displayed on the second screen 32, using the binocular parallax images and initial solutions FI[0] and MI[0]. The above can be restated as follows with the increment variable i as 1. The layered image generator 912 determines, in the internal data BIPR[i] generator 912a1, internal data BIPR[i] of an image to be displayed on the second screen 32, using the binocular parallax images and initial solutions FI[i−1] and MI[i−1] (ST904).

The internal data BIPR[i] generator 912a1 then sends the determined internal data BIPR[i] of the image to be displayed on the second screen 32 to the internal data BIPR[i] limiter 912a2. The internal data BIPR[i] limiter 912a2 applies a limiting condition required for display on the second screen 32 to the internal data BIPR[i] to determine internal data BI[i]. The internal data BIPR[i] limiter 912a2 outputs the internal data BI[i] as an output of the internal data BI[i] generator 912a (ST905).

The internal data BI[i] generator 912a then sends the determined internal data BI[i] to the internal data MIPR[i] generator 912c1. The internal data MIPR[i] generator 912c1 determines internal data MIPR[i] of an image to be displayed on the third screen 90, using the binocular parallax images, the initial solution FI[0] generated by the initial solution generator 911, and the internal data BI[i]. The above can be restated as follows with the increment variable i as 1. The internal data MIPR[i] generator 912c1 determines internal data MIPR[i] of an image to be displayed on the third screen 90, using the binocular parallax images, the initial solution FI[i−1] generated by the initial solution generator 911, and the internal data BI[i] (ST906).

The internal data MIPR[i] generator 912c1 then sends the determined internal data MIPR[i] of the image to be displayed on the third screen 90 to the internal data MIPR[i] limiter 912c2. The internal data MIPR[i] limiter 912c2 applies a limiting condition required for display on the third screen 90 to the internal data MIPR[i] of the image to be displayed on third screen 90 to determine internal data MI[i]. The internal data MIPR[i] limiter 912c2 outputs the internal data MI[i] as an output of the internal data MI[i] generator 912c (ST907).

The internal data MI[i] generator 912c then sends the determined internal data MI[i] to the internal data FIPR[i] generator 912b1. The internal data FIPR[i] generator 912b1 determines internal data FIPR[i] of an image to be displayed on the first screen 31, using the binocular parallax images and internal data BI[i] and MI[i] (ST908).

The internal data FIPR[i] generator 912b1 then sends the determined internal data FIPR[i] of the image to be displayed on the first screen 31 to the internal data FIPR[i] limiter 912b2. The internal data FIPR[i] limiter 912b2 applies a limiting condition required for display on the first screen 31 to the internal data FIPR[i] of the image to be displayed on the first screen 31 to determine internal data FI[i]. The internal data FIPR[i] limiter 912b2 outputs the internal data FI[i] as an output of the internal data FI[i] generator 912b (ST909).

The internal data FI[i] generator 912b outputs the internal data FI[i] to the iterative process controller 914. The internal data BI[i] generator 912a outputs the internal data BI[i] to the iterative process controller 914. The internal data MI[i] generator 912c outputs the internal data MI[i] to the iterative process controller 914. Thus, the layered image generator 912 outputs the internal data FI[i], BI[i], and MI[i] to the iterative process controller 914. The iterative process controller 914 determines whether the input data satisfies a process termination condition (ST910).

If the iterative process controller 914 determines that the process termination condition is not satisfied, the iterative process controller 914 adds 1 to the increment variable i for controlling the iterative process (ST911), and outputs FI[i] and MI[i] to the layered image generator 912. The layered image generator 912 performs again the processes of ST904, ST905, ST906, ST907, ST908, and ST909. Each time this iterative process is performed, the layered image generator 912 receives internal data FI[i−1] of the image to be displayed on the first screen 31 and internal data MI[i−1] of the image to be displayed on the third screen 90, and outputs internal data BI[i] of the image to be displayed on the second screen 32, internal data FI[i] of the image to be displayed on the first screen 31, and internal data MI[i] of the image to be displayed on the third screen 90 to the iterative process controller 914.

If the iterative process controller 914 determines that the process termination condition is satisfied, the internal data FI[i], MI[i], and BI[i] finally generated at this time are output as the image FI to be displayed on the first screen 31, the image MI to be displayed on the third screen 90, and the image BI to be displayed on the second screen 32 (ST912), and the process ends (ST913).

The image processing apparatus 924 performs a control for displaying, on the liquid crystal layer 21, the image FI to be displayed on the first screen 31, a control for displaying, on the liquid crystal layer 22, the image BI to be displayed on the second screen 32, and a control for displaying, on the liquid crystal layer 920, the image MI to be displayed on the third screen 90. Since the pixel values FI[i](n), MI[i](k), and BI[i](m) of the internal data generated by the layered image generator 912 are values linear to display brightness, it is preferable to perform display control after converting them into gray level values of images through inverse gamma conversion or the like.

The processes of ST903, ST904, ST905, ST906, ST907, ST908, ST909, and ST910 will be described in detail below.

<1> ST904: Generation of Internal Data BIPR[i]

The process of generating, in the internal data BIPR[i] generator 912a1, internal data BIPR[i] of the second screen image using the binocular parallax images, the initial solution FI[0] or internal data FI[i−1] of the first screen image, and the initial solution MI[0] or internal data MI[i−1] of the third screen image will be described. Similarly to the image FI, for internal data FI[i], a pixel value at horizontal coordinate n will be denoted by FI[i](n). Similarly to the image MI, for internal data MI[i], a pixel value at horizontal coordinate k will be denoted by MI[i](k). Similarly to the image BI, for the internal data BIPR[i], a pixel value at horizontal coordinate m will be denoted by BIPR[i](m).

Two equations 25 and 26 below are obtained by substituting the pixel values of the images L' and R' viewed through the two screens in Equations 23 and 24 with the pixel values of the left-eye image L and right-eye image R of the binocular parallax images and transforming each of them so that the pixel value BI(x) is on the left-hand side.

$$BI(x)=L(x-s)-FI(x-2 \cdot x)-MI(x-s) \quad \text{(Equation 25)}$$

$$BI(x)=R(x+s)-FI(x+2 \cdot s)-MI(x+s) \quad \text{(Equation 26)}$$

If the pixel values FI[i](x), MI[i](x), and BI(x) can be determined so that Equations 25 and 26 are satisfied, it is possible to display the binocular parallax images by the 3D image display apparatus 20.

In Equations 25 and 26, L(x−s) and R(x+s) can be determined from the input left-eye image L and right-eye image R. The pixel values FI(x−2·s) and FI(x+2·s) can be determined from the initial solution FI[0] generated in ST903 or the internal data FI[i−1] generated in ST909. Further, the pixel values MI(x−s) and MI(x+s) can be determined from the initial solution MI[0] generated in ST903 or the internal data MI[i−1] generated in ST907. Thus, for the pixel value BI(x), two values can be obtained from Equations 25 and 26.

The pixel value BI(x) can take only one value, and the pixel value BI(x) satisfying both Equations 25 and 26 is obtained only when the pixel values BI(x) obtained from Equations 25 and 26 are equal to each other.

Thus, an average of the two values obtained from Equations 25 and 26 is determined as the pixel value BI(x). The internal data BIPR[i](x) can be calculated as in Equation 27 using the above method.

$$BIPR[i](x) = \frac{\left\{\begin{array}{c} L(x-s) - FI[i-1](x-2 \cdot s) - \\ MI[i-1](x-s) \end{array}\right\} + \left\{\begin{array}{c} R(x+s) - FI[i-1](x+2 \cdot s) - \\ MI[i-1](x-s) \end{array}\right\}}{2} \quad \text{(Equation 27)}$$

The internal data BIPR[i](x) can be calculated by using Equation 27 to determine values for all the pixels in the image to be displayed on the second screen.

<2> ST906: Generation of Internal Data MIPR[i]

The process of generating, in the internal data MIPR[i] generator 912c1, internal data MIPR[i] using the binocular parallax images, the initial solution FI[0] or internal data FI[i−1], and the internal data BI[i] will be described. Equations 28 and 29 are obtained by substituting x+s=x into Equations 21 and 24.

$$L'(x)=FI(x-s)+MI(x)+BI(x+s) \quad \text{(Equation 28)}$$

$$R'(x)=FI(x+s)+MI(x)+BI(x-s) \quad \text{(Equation 29)}$$

Equations 30 and 31 below are obtained by substituting the pixel values of the images L' and R' viewed through the two screens in Equations 28 and 29 with the pixel values of the left-eye image L and right-eye image R of the binocular parallax images, and transforming each of them so that MI(x) is on the left-hand side.

$$MI(x)=L(x)-FI(x-s)-BI(x+s) \quad \text{(Equation 30)}$$

$$MI(x)=R(x)-FI(x+s)-BI(x-s) \quad \text{(Equation 31)}$$

If the pixel values FI(x), MI(x), and BI(x) can be determined so that Equations 30 and 31 are satisfied, it is possible to display the binocular parallax images by the 3D image display apparatus 20.

In Equations 30 and 31, the pixel values L(x) and R(x) can be determined from the pixel values of the input left-eye image L and right-eye image R. The pixel values FI(x−s) and FI(x+s) can be determined from the initial solution FI[0] generated in ST903 or the internal data FI[i−1] generated in ST909. The pixel values BI(x+s) and BI(x−s) can be uniquely determined using the internal data BI[i] generated in ST905. Thus, for the pixel value MI(x), two values can be obtained from Equations 30 and 31.

The pixel value MI(x) can take only one value, and the pixel value MI(x) satisfying both Equations 30 and 31 is obtained only when the pixel values MI(x) obtained from Equations 30 and 31 are equal to each other.

Thus, an average of the two values obtained from Equations 30 and 31 is determined as the pixel value MI(x). For the internal data MIPR[i](x), Equation 32 is obtained using the above method.

(Equation 32)

$$MIPR[i](x) = \frac{\left\{\begin{array}{c}L(x) - FI[i-1](x-s) - \\ BI[i](x+s)\end{array}\right\} + \left\{\begin{array}{c}R(x) - FI[i-1](x+s) - \\ BI[i](x-s)\end{array}\right\}}{2}$$

The internal data MIPR[i] can be calculated by using Equation 32 to determine values for all the pixels in the image to be displayed on the third screen.

<3> ST908: Generation of Internal Data FIPR[i]

The process of generating, in the internal data FIPR[i] generator 912b1, internal data FIPR[i] using the binocular parallax images and internal data BI[i] will be described. Equations 33 and 34 below are obtained by substituting the pixel values of the images L' and R' viewed through the two screens in Equations 21 and 22 with the pixel values of the left-eye image L and right-eye image R of the binocular parallax images, and transforming each of them so that the pixel value FI(x) is on the left-hand side.

$$FI(x) = L(x+s) - MI(x+s) - BI(x+2 \cdot s) \quad \text{(Equation 33)}$$

$$FI(x) = R(x-s) - MI(x-s) - RI(x-2 \cdot s) \quad \text{(Equation 34)}$$

If the pixel values FI(x), MI(x), and BI(x) can be determined so that Equations 33 and 34 are satisfied, it is possible to display the binocular parallax images by the 3D image display apparatus 20.

In Equations 33 and 34, the pixel values L(x+s) and R(x−s) can be determined from the pixel values of the input left-eye image L and right-eye image R. The pixel values BI(x+2·s) and BI(x−2·s) can be uniquely determined using the internal data BI[i] generated in ST905. The pixel values MI(x+s) and MI(x−s) can be uniquely determined using the internal data MI[i] generated in ST907. Thus, for the pixel value FI(x), two values can be obtained from Equations 33 and 34.

The pixel value FI(x) can take only one value, and the pixel value FI(x) satisfying both Equations 33 and 34 is obtained only when the pixel values FI(x) obtained from Equations 33 and 34 are equal to each other.

Thus, an average of the two values obtained from Equations 33 and 34 is determined as the pixel value FI(x). The internal data FIPR[i](x) can be calculated as in Equation 35 using the above method.

(Equation 35)

$$FIPR[i](x) = \frac{\left\{\begin{array}{c}L(x+s) - MI[i](x+s) - \\ BI[i](x+2 \cdot s)\end{array}\right\} + \left\{\begin{array}{c}R(x-s) - MI[i](x-s) - \\ BI[i](x-2 \cdot s)\end{array}\right\}}{2}$$

The internal data FIPR[i] can be calculated by using Equation 35 to determine values for all the pixels in the image to be displayed on the first screen.

<4> ST905, ST907, and ST909: Application of Limiting Condition

The internal data BIPR[i] limiter 912a2 applies the limiting condition required for display on the second screen 32 to the internal data BIPR[i] generated by the internal data BIPR[i] generator 912a1, to generate the internal data BI[i]. The internal data MIPR[i] limiter 912c2 applies the limiting condition required for display on the third screen 920 to the internal data MIPR[i] generated by the internal data MIPR[i] generator 912c1, to generate the internal data MI[i]. Likewise, the internal data FIPR[i] limiter 912b2 applies the limiting condition required for display on the first screen 31 to the internal data FIPR[i] generated by the internal data FIPR[i] generator 912b1, to generate the internal data FI[i]. The layered image generator 912 generates internal data of each of the screen images, from the limiting condition and the internal data of the screen images to be displayed on the screens excluding the internal data of the one end image. Here, "the internal data of the screen images to be displayed on the screens excluding the internal data of the one end image" is FI[0] and MI[0]. Also here, the "internal data of each of the screen images" is the internal data BI[i], MI[i], and FI[i].

In the third embodiment, the liquid crystal layers are used as the first screen 31, second screen 32, and the third screen 90. When a liquid crystal layer is used, it is possible to change the polarization angle with respect to polarized light passing through the liquid crystal layer, but its range is limited to 0 to 90 degrees. Also, the change of the polarization angle is limited to addition, and no change in a negative direction by subtraction is possible. This is the same as in the first embodiment. There are three screens: the first screen 31, second screen 32, and third screen 90. There are also three internal data items to be subjected to the clipping process: the internal data BIPR[i], MIPR[i], and FIPR[i]. However, the content of the process in the third embodiment is the same as that in the first embodiment, so detailed description of the content of the process will be omitted.

<5> ST903: Generation of Initial Solutions FI[0] and MI[0]

The initial solution generator 911 generates, from the input binocular parallax images (left-eye image and right eye image), the initial solution FI[0], which is internal data of an image of the first screen 31, and the initial solution MI[0]. The initial solution generator 911 generates, from data of multiple input images, internal data of screen images to be displayed on screens excluding internal data of one end image. Here, the "internal data of one end image" is BI[i], and the "internal data of screen images to be displayed on screens excluding internal data of one end image" is FI[0] and MI[0].

One method of generating the initial solutions FI[0] and MI[0] is to determine one of the left-eye image L and right-eye image R as the initial solution FI[0] or MI[0]. Another method is to determine an image obtained by halving the gray level values of one of the left-eye image L and right-eye image R, as the initial solution FI[0] or MI[0]. That is, each of the initial solutions FI[0] and MI[0] may be set to one of the four types of images (i.e., the left-eye image L, the right-eye image R, the image obtained by halving the gray level values of the left-eye image L, and the image obtained by halving the gray level values of the right-eye image R), and thus there are 16 combinations.

Another method of generating the initial solutions FI[0] and MI[0] is to determine an average of the left-eye image L and right-eye image R, as the initial solution FI[0] or MI[0]. Another method is to determine an image obtained by halving the gray level values of an average of the left-eye image L and right-eye image R, as the initial solution FI[0] or MI[0]. That is, each of the initial solutions FI[0] and MI[0] may be set to one of the average of the left-eye image L and right-eye image R and the image obtained by halving the gray level values of the average of the left-eye image L and right-eye image R, and thus there are 4 combinations.

Still another method of generating the initial solutions FI[0] and MI[0] is to extract only a common component included in the left-eye image L and right-eye image R. Specifically, a difference between pixels at the same coordinates in the left-eye image L and right-eye image R may be determined; if the difference is 0, the gray level value of the pixels may be employed in the initial solution FI[0] or MI[0], and if the difference is not 0, a gray level value 0 may be employed in the initial solution FI[0] or MI[0]. Another method is to determine an image obtained by halving the gray level values of a common component included in the left-eye image L and right-eye image R, as the initial solution FI[0] or MI[0]. That is, each of the initial solutions FI[0] and MI[0] may be set to one of the common component included in the left-eye image L and right-eye image R and the image obtained by halving the gray level values of the common component included in the left-eye image L and right-eye image R, and thus there are four combinations.

The first embodiment has described that, by determining only a common component included in the left-eye image L and right-eye image R as the initial solution FI[0], it becomes possible to satisfy the process termination condition with a small number of iterations of the iterative process. This applies to the third embodiment, and it becomes possible to satisfy the process termination condition with a small number of iterations of the iterative process by determining the initial solution FI[0] or MI[0] from only the common component included in the left-eye image L and right-eye image R or from the gray level values obtained by halving the gray level values of the common component.

Another method is to use a depth map to generate the initial solutions FI[0] and MI[0], as described in the second embodiment. The depth map indicates depth information for each pixel of the left-eye image L and right-eye image R. It is possible to divide the depths indicated by the depth map by the first, second, and third screens, determine ratios based on the depth coordinates indicated by the depth map and distances to each screen, and multiply the left-eye image L or right-eye image R by the ratios to obtain an image as the initial solutions FI[0] and MI[0].

By using the depth map, it is possible to set the initial solutions so that a front part of an object to be displayed is displayed by the first screen and a middle part of the object is displayed by the third screen. By matching the arrangement of objects to be displayed with the arrangement of the screens in this manner, it is possible to display a more natural 3D image to the viewer and reduce the number of iterations of the process until the convergence in the iterative process.

As in the first embodiment, it is desirable that the initial solutions FI[0] and MI[0] be determined under the limiting conditions required for display on the first screen 31 and third screen 90. Although not illustrated in FIG. 12, it is possible to perform the process by the layered image generator 912 after applying in a limiting condition application unit 913, the limiting condition indicated by Formula 13 to the initial solutions FI[0] and MI[0] generated by the initial solution generator 911.

<6> ST910: Setting of Process Termination Condition

As evaluation of the process termination condition performed by the iterative process controller 914, it is possible to determine, using the generated internal data FI[i], MI[i], and BI[i], the images L' and R' viewed by both eyes of the viewer, further determine differences between the images L' and R' and the binocular parallax images L and R to be displayed, and evaluate a condition that both the differences are below a predetermined value. In this case, the binocular parallax images L and R need to be input to the iterative process controller 914.

It is also possible to determine a difference between the generated internal data FI[i] and the internal data FI[i−1] generated in the previous round, and evaluate a condition that the difference is below a predetermined value.

Likewise, it is possible to determine a difference between the generated internal data MI[i] and the internal data MI[i−1] generated in the previous round, and evaluate a condition that the difference is below a predetermined value. It is possible to determine a difference between the generated internal data BI[i] and the internal data BI[i−1] generated in the previous round, and evaluate a condition that the difference is below a predetermined value.

Further, it is possible to evaluate a condition that all of the difference between the internal data FI[i] and FI[i−1], the difference between the internal data BI[i] and BI[i−1], and the difference between the internal data MI[i] and MI[i−1] are below a predetermined value.

As the predetermined values, arbitrary values may be used.

However, when an arbitrary value is used as the predetermined value, there is a problem in that, since the magnitude of the difference depends on the input binocular parallax images, the number of iterations of the iterative process until termination of the process varies greatly with the input binocular parallax images.

To solve this problem, for example, for the internal data FI[i], with a difference between FI[2] and FI[1] as a reference, a value obtained by multiplying the difference by a ratio may be used as the predetermined value. Likewise, for the internal data MI[i], with a difference between MI[2] and MI[1] as a reference, a value obtained by multiplying the difference by a ratio may be used as the predetermined value. Likewise, for the internal data BI[i], with a difference between BI[2] and BI[1] as a reference, a value obtained by multiplying the difference by a ratio may be used as the predetermined value.

By determining the predetermined value using the ratio in this manner, it is possible to reduce the variation in the number of iterations of the iterative process until termination of the process, regardless of the input binocular parallax images.

It is also possible to fix the number of iterations of the iterative process to a predetermined number of times. By fixing the number of iterations of the iterative process, it is possible to make the processing time constant or less than a predetermined time. The predetermined number of times here is $1/(RR \cdot t)$, where RR [Hz] is a refresh rate and t [s] is the time required for one round of the iterative process. The time required for one round of the iterative process depends on the device used for the process.

Although the pixels in the single line extending in the horizontal direction on each screen have been described in FIG. 11, the same process is applied to the pixels in all the lines. The internal data FI[i], MI[i], and BI[i] are obtained by performing the process on all the lines.

The third embodiment has described the method in which the process is iterated in the order of ST904 to ST909. Thus, values of the image BI to be displayed on the second screen, values of the image MI to be displayed on the third screen, and values of the image FI to be displayed on the first screen are updated the same number of times. Thus, it is possible to prevent a situation where one of the BI, MI, and FI converges earlier than the others and the iterative process is iterated unnecessarily. As a result, the iterative process can be performed efficiently overall.

The third embodiment has described the apparatus and method that displays the binocular parallax images using the stack of three screens. The present invention enables perception of a 3D image beyond the three screens. An object to be perceived is not limited to simple figures, and binocular parallax images, such as natural images, having complex depth information can also be displayed.

The use of the stacked three screens increases the number of display pixels existing on a line of sight and increases the number of values that each pixel can take, and thereby can reduce errors in the iterative process, thereby improving the quality of the binocular parallax images perceived by the viewer.

Further, the use of the stacked three screens allows the depth of the entire display apparatus to be increased. By increasing the depth of the entire display apparatus, it is possible to display a 3D image using screens physically separated farther from each other, and display a 3D image having greater depth. On the other hand, when the stacking interval between screens is extremely increased to increase the depth of the entire display apparatus, there is a problem in that the screens are viewed independently of each other from the viewer, and when a 3D image is displayed, depth are not continuously perceived between the screens. By increasing the number of layers, it is possible to increase the depth of the entire display apparatus without increasing the stacking interval between liquid crystal layers. Specifically, by using three liquid crystal layers, it is possible to double the depth of the entire display apparatus while maintaining the stacking interval between the liquid crystal layers, as compared to the case where two liquid crystal layers are stacked.

The above example uses three liquid crystal screens, but four or more liquid crystal screens may be used. When a fourth liquid crystal screen is added to the 3D image display apparatus, it may be added between the first liquid crystal screen and the third liquid crystal screen, as in the case of adding the third liquid crystal screen.

In the third embodiment, the image processing apparatus 924 is configured by adding the internal data MI[i] generator 912c to the image processing apparatus 24 of the first embodiment. Similarly to this, it is possible to configure an image processing apparatus corresponding to the image display apparatus including the fourth liquid crystal screen. Specifically, an internal data MI2[1] generator 912d for generating internal data MI2[i] of an image to be displayed on the fourth liquid crystal screen may be added between the internal data MI[i] generator 912c and internal data FI[i] generator 912b in the image processing apparatus 924. The internal data MI2[i] generator 912d has the same configuration as the internal data MI[i] generator 912c, and differs from it only in the input-output relationship. Specifically, it receives L, R, BI[i], MI[i], and FI[i−1], and outputs MI2[i].

The initial solution generator 911 generates MI2[0] in addition to FI[0] and MI[0]. The internal data BI[i] generator 912a receives L, R, MI[i−1], MI2[i−1], and FI[i−1], and outputs BI[i]. The internal data MI[i] generator 912c receives L, R, BI[i], MI[i−1], and FI[i−1], and outputs MI[i]. The internal data FI[i] generator 912b receives L, R, BI[i], MI[i], and MI2[i], and outputs FI[i]. The iterative process controller 914 receives BI[i], MI[i], MI2[i], and FI[i], and determines whether the received data satisfies a process termination condition.

Even when liquid crystal screens, such as fifth liquid crystal screen and sixth liquid crystal screen, are added in addition to the fourth liquid crystal screen, an image display apparatus and an image processing apparatus can be easily produced by adding elements in the same way.

Besides 3D image display apparatuses, the present invention is also applicable to multi-view image display apparatuses. A multi-view image display apparatus displays different images to viewers located in different directions from the display apparatus. For example, it may be used to display different images to a person in a driver's seat and a person in a front passenger's seat in an automobile.

In the first embodiment, binocular parallax images are input. By replacing them with images to be displayed to a person in a driver's seat and a person in a front passenger's seat, it is possible to provide a dual-view image display apparatus.

In the second embodiment, binocular parallax images and a central viewpoint image are input. By replacing them with images to be displayed to a person in a driver's seat, a person in a front passenger's seat, and a person in a central rear seat, it is possible to provide a triple-view image display apparatus. Likewise, it is also possible to display images to four or more viewpoints.

In the third embodiment, binocular parallax images are input. By replacing them with images to be displayed to a person in a driver's seat and a person in a front passenger's seat, it is possible to provide a triple-view image display apparatus. Likewise, it is also possible to display images to four or more viewpoints.

The above-described methods display images in each of directions symmetric with respect to the first and second screens in the left-right direction, but the present invention is applicable to directions asymmetric in the left-right direction by replacing the pixels with pixels through which lines of sight in the respective directions pass.

Further, the above describes methods of displaying multi-view images in a horizontal direction of an image display apparatus, but it is also possible to display multi-view images in a vertical direction of an image display apparatus by applying the same process in a vertical direction of images. Further, by performing a process in the vertical direction after a process in the horizontal direction, it is possible to deal with viewpoints in oblique directions.

A multi-view image display apparatus can also be used as a display apparatus that hides an image depending on the viewing direction so that a viewer can correctly view the image only when the viewer views it from a particular direction.

The above-described methods use the increment variable i and add 1 to i each time the iterative process is performed, but it is also possible to use a decrement variable and subtract 1 from i each time the iterative process is performed.

REFERENCE SIGNS LIST 10 input unit
11 initial solution generator
12 layered image generator
13 limiting condition application unit
14 iterative process controller
15 output unit
20 3D image display apparatus
21 liquid crystal layer
22 liquid crystal layer
23 backlight
24 image processing apparatus
25 viewer
26 line of sight
31 first screen
32 second screen
33 left eye
34 right eye
35 left-eye image
36 right-eye image
37 group of lines of sight
38 group of lines of sight
401 group of pixels on first screen
402 group of pixels on second screen
405 line of sight
406 line of sight
407 pixel
408 pixel
409 pixel
413 projection point
414 projection point
415 backlight
505 line of sight
506 line of sight
507 pixel
508 pixel
509 pixel
513 projection point
514 projection point
70 central viewpoint
71 central viewpoint image
80 line of sight
81 pixel
82 projection point
90 third screen
901 group of pixels on third screen
902 pixel
903 pixel
910 input unit
911 initial solution generator
912 layered image generator
913 limiting condition application unit
914 iterative process controller
915 output unit
920 liquid crystal layer

The invention claimed is:

1. An image processing apparatus comprising:
an input unit that receives a plurality of different input images;
an initial solution generator that generates, from data of the plurality of different input images, as an initial solution, internal data of one or more screen images of a layered image, the layered image including a plurality of screen images consisting of the one or more screen images and one end image;
a layered image generator that iteratively performs an iterative process of generating internal data of the plurality of screen images; and
an iterative process controller that evaluates a process termination condition for terminating generation of internal data of the screen images, and when the process termination condition is satisfied, outputs, as data of the layered image, the internal data of the plurality of screen images finally generated by the layered image generator,
wherein the layered image generator generates internal data of the plurality of screen images from the initial solution and a limiting condition in a first round of the iterative process, and until the process termination condition is satisfied, in each of one or more rounds of the iterative process after the first round, the layered image generator generates new internal data of the plurality of screen images from the internal data of the plurality of screen images generated in the previous round of the iterative process and the limiting condition,
wherein as a number of iterations of the iterative process increases, a difference between the new internal data of the screen images and the internal data of the screen images generated in the previous round of the iterative process decreases.

2. The image processing apparatus of claim 1, wherein the limiting condition is a condition for limiting internal data of the respective screen images within respective displayable ranges of a plurality of screens for displaying the layered image.

3. The image processing apparatus of claim 1, wherein the initial solution is an average of the data of the plurality of different input images.

4. The image processing apparatus of claim 1, wherein the plurality of different input images are binocular parallax images, and the initial solution is a common component of the binocular parallax images that includes no parallax component of the binocular parallax images.

5. The image processing apparatus of claim 1, wherein the initial solution is determined using a depth map indicating depths of the plurality of different input images.

6. The image processing apparatus of claim 1, wherein the process termination condition is a predetermined number of iterations.

7. The image processing apparatus of claim 1, wherein the process termination condition is that a difference between the new internal data of the screen images generated by the layered image generator and the internal data of the screen images generated by the layered image generator in the previous round of the iterative process is is below a value obtained by multiplying a difference between the internal data of the screen images generated in the first round of the iterative process and the internal data of the screen images generated in the second round of the iterative process, by a predetermined ratio, and
wherein a number of iterations of the iterative process when the predetermined ratio is large is less than a number of iterations of the iterative process when the predetermined ratio is small.

8. The image processing apparatus of claim 1, wherein when generating internal data of one of the screen images, the layered image generator uses at least one difference between the data of the plurality of different input images and internal data of the screen images excluding the internal data of the one of the screen images.

9. The image processing apparatus of claim 1, wherein when generating internal data of one of the screen images, the layered image generator takes a weighted average using a plurality of differences between the data of the plurality of different input images and internal data of the screen images excluding the internal data of the one of the screen images, and wherein when taking the weighted average, the layered image generator applies different weights to the plurality of differences.

10. The image processing apparatus of claim 1, wherein the plurality of different input images include binocular parallax images.

11. The image processing apparatus of claim 10, wherein plurality of different input images further include a central viewpoint image.

12. An image display apparatus comprising:
the image processing apparatus of claim 1; and
a plurality of screens stacked parallel to each other at predetermined intervals,
wherein the image display apparatus displays, on the plurality of screens, the internal data output as the data of the layered image by the iterative process controller.

13. The image display apparatus of claim 12, wherein the plurality of screens are formed by liquid crystal panels.

14. The image processing apparatus of claim 1, wherein:
the layered image includes a first screen image and a second screen image;
the initial solution generator generates, from the data of the plurality of input images, as the initial solution, internal data FI[i−1] of the first screen image when an increment variable i is 1;
in the iterative process, the layered image generator generates internal data BI[i] of the second screen image from the internal data FI[i−1] of the first screen image and the limiting condition, and generates internal data FI[i] from the internal data BI[i] of the second screen image and the limiting condition; and
the iterative process controller determines whether the internal data FI[i] and the internal data BI[i] satisfy the process termination condition, and when the process termination condition is not satisfied, adds 1 to the increment variable i and causes the process by the layered image generator to continue, and when the process termination condition is satisfied, terminates the process by the layered image generator,
outputs, as the first screen image, the internal data FI[i] when the process by the layered image generator is terminated, and outputs, as the second screen image, the internal data BI[i] when the process by the layered image generator is terminated.

15. The image processing apparatus of claim 1, wherein:
the layered image includes a first screen image, a second screen image, and a third screen image;
the initial solution generator generates, from the data of the plurality of input images, as the initial solution, internal data FI[i−1] of the first screen image and internal data MI[i−1] of the third screen image when an increment variable i is 1;
in the iterative process, the layered image generator generates internal data BI[i] of the second screen image from the internal data FI[i−1], the internal data MI[i−1], and the limiting condition, generates internal data MI[i] of the third screen image from the internal data FI[i−1], the internal data BI[i], and the limiting condition, and generates internal data FI[i] from the internal data MI[i], the internal data BI[i], and the limiting condition; and
the iterative process controller determines whether the internal data FI[i], the internal data MI[i], and the internal data BI[i] satisfy the process termination condition, and when the process termination condition is not satisfied, adds 1 to the increment variable i and causes the process by the layered image generator to continue, and when the process termination condition is satisfied, terminates the process by the layered image generator,
outputs, as the first screen image, the internal data FI[i] when the process by the layered image generator is terminated, outputs, as the third screen image, the internal data MI[i] when the process by the layered image generator is terminated, and outputs, as the second screen image, the internal data BI[i] when the process by the layered image generator is terminated.

16. An image processing method comprising:
receiving a plurality of different input images;
generating, from data of the plurality of different input images, as an initial solution, internal data of one or more screen images of a layered image, the layered image including a plurality of screen images consisting of the one or more screen images and one end image;
iteratively performing an iterative process of generating internal data of the plurality of screen images; and
evaluating a process termination condition for terminating generation of internal data of the screen images, and when the process termination condition is satisfied, outputting, as the layered image, the internal data of the plurality of screen images generated in the last round of the iterative process,
wherein the iteratively performing includes generating internal data of the plurality of screen images from the initial solution and a limiting condition in a first round of the iterative process, and until the process termination condition is satisfied, in each of one or more rounds of the iterative process after the first round, generating new internal data of the plurality of screen images from the internal data of the plurality of screen images generated in the previous round of the iterative process and the limiting condition, and
wherein as a number of iterations of the iterative process increases, a difference between the new internal data of the screen images and the internal data of the screen images generated in the previous round of the iterative process decreases.

* * * * *